United States Patent [19]

Bonissone et al.

[11] Patent Number: 5,058,033

[45] Date of Patent: Oct. 15, 1991

[54] REAL-TIME SYSTEM FOR REASONING WITH UNCERTAINTY

[75] Inventors: Piero P. Bonissone, Schenectady, N.Y.; Lise M. Pfau, Baden, Switzerland

[73] Assignee: General Electric Company, Schenectady, N.Y.

[21] Appl. No.: 396,407

[22] Filed: Aug. 18, 1989

[51] Int. Cl.$^5$ .................................................. G06F 15/36
[52] U.S. Cl. .................................................. 364/513
[58] Field of Search .......................................... 364/613

[56] References Cited

U.S. PATENT DOCUMENTS

| | | | |
|---|---|---|---|
| 4,642,782 | 2/1987 | Kemper et al. | 364/550 |
| 4,649,515 | 3/1987 | Thompson et al. | 364/900 |
| 4,658,370 | 4/1987 | Erman et al. | 364/513 |
| 4,713,775 | 12/1987 | Scott et al. | 364/513 |
| 4,803,642 | 2/1988 | Muranaga | 364/513 |
| 4,860,213 | 8/1989 | Bonissone | 364/513 |

OTHER PUBLICATIONS

Nii, "Blackboard Systems: Blackboard Application Systems, Blackboard Systems from a Knowledge Engineering Perspective", *AI Magazine*, Aug. 1986.
Wangming, "A Multivalued Logic System with Respect to T-Norms", Fuzzy Computing, Gupta & Yanakawa, Ed., North-Holland, 1988, pp. 101-118.
Garner et al., "General Purpose Inference Engine for Canonical Graph Models", Knowledge-Based Sytems, vol. 1, No. 5, Dec. 1988, pp. 266-278.
Lindley, "The Probability Approach to the Treatment of Uncertainty in Artificial Intelligence and Expert Systems", *Statistical Science*, vol. 2, No. 1, 1987, pp. 3-44.
"Artificial Intelligence", by P. H. Winston, Addison-Wesley Publishing Co., 1984, pp. 191-197.
"A Fuzzy Sets Based Linguistic Approach: Theory and Applications", by Bonissone, Proceedings of the 1980 Winter Simulation Conference (T. I. Oren, S. M. Shub and P. F. Roth, eds.) Orlando, Florida, Dec., 1980, pp. 99-111.
"RUM: A Layered Architecture for Reasoning with Uncertainty", by P. Bonissone, 10th International Joint Conference on Artificial Intelligence, Milan, Italy, Aug. 23-30, 1987.
Published viewgraphs of oral presentation of "Reasoning with Incomplete and Uncertain Information" by P. Bonissone, at DARPA sponsored by Expert System Research Workshop, Friendship, Ohio, Oct. 9-10, 1986.
Uncertainty in Artificial Intelligence, sponsored by American Association for Artificial Intelligence, Seattle, Washington, Jul. 10-12, 1987.
"Reasoning with Uncertainty for Improved Situational Awareness in Pilot's Associate" by L. M. Sweet et al., 12th DARPA Strategic Systems Symposium, Monterey, CA, Oct. 28-30, 1986.
L. M. Pfau, "RUMrunner: Real-time Reasoning with Uncertainty", General Electric Company, Corporate Research & Development, dated Dec. 3, 1987.

(List continued on next page.)

*Primary Examiner*—Allen R. MacDonald
*Assistant Examiner*—Roger S. Joyner
*Attorney, Agent, or Firm*—Paul R. Webb, II; James C. Davis, Jr.

[57] ABSTRACT

The invention is directed to an automated, real-time, rule-based reasoning with uncertainty system and method for practicing same. The system has a three layer structure comprising of representation, inference and control layers. Rule firings and conclusions are computed in the inference layer in a manner to propagate uncertainty information through the system in accordance with predetermined formulas designated by the control layer. Rule structures and conclusions and uncertainty information associated therewith are represented to the user in the representation layer. The control layer includes a planning mechanism which determines the fastest plan for reaching the conclusion and generates prioritized alternate plans which, if time permits, will be executed in accordance with their respective priorities.

99 Claims, 13 Drawing Sheets

OTHER PUBLICATIONS

Bonissone et al., "Plausible Reasoning in Dynamic Classification Problems", Validation and Testing Knowledge-Based Systems Workshop, Minneapolis, MN, Aug. 20, 1988.

Bonissone, "Now That I Have a Good Theory of Uncertainty, What Else Do I Need?", 5th Workshop of Uncertainty in AI, Windsor, Canada, Aug. 18, 1989.

Bonissone, "Demonstration of Reasoning with Uncertainty Module (RUM): Contact Assessor and Intent Projector", presented to DARPA Naval Technology Office, Naval Underwater System Command and other government representatives, May, 1989.

Bonissone et al., "Time-Constrained Reasoning Under Uncertainty", AAAI Workshop on Real-Time AI Problems, Detroit, MI, Aug., 1989.

Bonissone, U.S. patent application Ser. No. 103,465 entitled "A Reasoning System for Reasoning With Uncertainty".

Bonissone et al., "Selecting Uncertainty Calculi and Granularity: An Experiment in Trading-Off Precision and Complexity", Uncertainty in Artificial Intelligence, edited by L. Kanal and J. Lemmer, North-Holland, 1986, pp. 217-247.

Szolovits et al., "Categorical and Probabilistic Reasoning in Medical Diagnosis", Artificial Intelligence Journal, vol. 11, 1978, pp. 115-144.

Schweizer et al., "Associative Functions and Abstract Semi-Groups", Publicationes Mathematicae Debrecen, vol. 10, 1963, pp. 69'481.

Declaration of John S. Beulick.
Declaration of Robert McNaughton.
Declaration of Piero Patrone Bonissone.
Declaration of Lise Marie Pfau.

| 2 | $P_1$ (A) : $F_1$ (A) |
|---|---|
| 4 | $P_2$ (B) : $F_2$ (B) |
| 3 | $P_3$ (C) : $F_3$ (C) |
| 5 | $P_4$ (D) : $F_4$ (D) |
| 6 | $P_5$ (E) : $F_5$ (E) |
| 1 | $P_6$ (F) : $F_6$ (F) |
| 4 | $P_7$ (G) : $F_7$ (G) |
| 2 | $P_8$ (H) : $F_8$ (H) |
| 9 | $P_9$ (I) : $F_9$ (I) |
| 8 | $P_{10}$ (J) : $F_{10}$ (J) |
| 3 | $P_{11}$ (K) : $F_{11}$ (K) |
| 1 | $P_{12}$ (M) : $F_{12}$ (M) |
| 6 | $P_{13}$ (N) : $F_{13}$ (N) |

*Fig. 3*

TOTAL EXECUTION TIME = 35 UNITS

TOTAL EXECUTION TIME = 42 UNITS

TOTAL EXECUTION TIME = 7 UNITS

TOTAL EXECUTION TIME = 14 UNITS

REAL-TIME SYSTEM FOR REASONING WITH UNCERTAINTY

The present invention is related in general to automated reasoning systems, and more specifically, to a real-time automated reasoning system for reasoning with uncertainty.

BACKGROUND OF THE INVENTION

A "reasoning system" as used herein is a system comprising rules structured to simulate a particular reasoning process. "Real-time" as used herein means the actual time in which an event takes place with the reporting on or recording of the event being practically simultaneous with the occurrence of the event.

Reasoning systems generally include a knowledge base. The knowledge base is a software model of the reasoning methodologies of one or more experts, usually elicited through extensive questioning. During development of a rule-based knowledge base, i.e. development of rule conclusions and rule predicates which comprise the rules of the knowledge base, data is input to the system and the system conclusions are compared with the expert conclusions. If a difference exits between the system and expert conclusions, then the rule conclusions and/or rule predicates are modified so that the system conclusions are in accord with the expert conclusions.

A reasoning system related to the present invention is described in allowed U.S. patent application Ser. No. 103,465, filed Oct. 1, 1987, entitled "A Reasoning System for Reasoning with Uncertainty", now U.S. Pat. No. 4,860,213, which is assigned to the present assignee and incorporated herein, in its entirety, by reference. The reasoning system described in the above-identified patent application, among other features, determines the degree to which a rule premise of a given rule has been satisfied, propagates an amount of uncertainty through the firing of a given rule, summarizes findings provided by various rules or knowledge sources, and detects inconsistencies among different sources of knowledge.

The reasoning system described in U.S. patent application Ser. No. 103,465 includes a knowledge base, a representation portion, a control portion and an inference portion. Specifically, the knowledge base comprises a plurality of system rules each having a premise and a conclusion. The rule premise comprises at least one clause including a variable to which a value can be assigned. In order to determine the total effect of a change-in-state of one variable, each rule of the knowledge base must be scanned to determine whether the clause of its rule premise includes that variable. After each affected rule is identified, then the rules are fired and a conclusion is determined.

The representation portion described in the above-identified patent application generates a value certainty interval associated with each value assigned to each rule premise variable, the value certainty interval having a lower and an upper bound respectively representative of amounts of confirmation and failure of refutation of the assigned value. The representation portion additionally represents to the user a sufficiency factor and a necessity factor associated with each rule. The sufficiency factor represents a strength of belief that the rule conclusion is true given the rule premise is true. The necessity factor represents a strength of belief that the rule conclusion is false given the rule premise is false. The control portion selects computational functions in accordance with which the value certainty interval associated with each assigned value is propagated through the system.

The inference portion described in the above-identified patent application computes a premise certainty interval from the value certainty intervals respectively associated with the values assigned to the premise clauses. A lower bound of the premise certainty interval is a first computational function of the respective value certainty interval lower bounds, the first function being selected in the control portion. An upper bound of the premise certainty interval is the first function of the respective value certainty interval upper bounds. The inference portion fires each rule by computing a conclusion detachment interval having a lower and an upper bound, the conclusion detachment interval lower bound being a second computational function of both the rule sufficiency factor and the premise certainty interval lower bound. The conclusion detachment interval upper bounds is a third computational function of both the rule necessity factor and the premise certainty interval upper bound, the second and third functions being selected by the control portion. The conclusion detachment interval lower and upper bounds are respectively representative of the amounts of certainty and failure of refutation of the rule conclusion.

In the case where the same conclusion is provided by more than one rule in a predetermined group of rules, the inference portion is adapted to compute a conclusion aggregation certainty interval for those same conclusions. A lower bound of the conclusion aggregation interval is a fourth computation function of the conclusion detachment interval lower bounds respectively computed for the rules providing the same conclusion. An upper bound of the conclusion aggregation interval is the fourth function of the conclusion detachment interval upper bounds respectively computed for the rules providing the same conclusion. The conclusion aggregation interval lower and upper bounds are respectively representative of the amounts of certainty and failure of refutation of the aggregated conclusions. The fourth function is selected by the control portion. The inference portion is further adapted to compute a source consensus certainty interval for a plurality of the conclusion aggregation intervals for the same conclusion, where the source consensus interval is the intersection of the plurality of conclusion aggregation intervals.

The first, second and third predetermined functions comprise triangular norm (T-norm) functions which are selected from a predetermined set of T-norm functions $T_1$, $T_2$ and $T_3$ by the control portion, for use by the inference portion, in computing the premise certainty and conclusion detachment intervals. Each T-norm function corresponds to a different attitude toward uncertainty evaluation. Specifically, the T-norm functions $T_1$, $T_2$ and $T_3$ respectively correspond to conservative, intermediate and non-conservative attitudes toward uncertainty evaluation.

The fourth predetermined function is selected from a predetermined set of triangular conorm (T-conorm) functions $S_2$, $S_{2.5}$ and $S_3$ by the control portion for use by the inference portion to compute the conclusion aggregation interval. Thus, the T-conorm functions $S_2$, $S_{2.5}$ and $S_3$ are respectively selected for aggregating the same conclusions provided by uncorrelated rules, correlated rules, and rules characterized as being intermediate between positively correlated and uncorrelated.

The reasoning system described in U.S. patent application Ser. No. 103,465 overcomes problems and disadvantages in automated systems for reasoning with uncertainty. The above-described reasoning system, however, does not operate in realtime. Specifically, the knowledge base, of the above-described reasoning system is "interpreted", as opposed to compiled. "Interpreted" means that each rule of the knowledge base must be sequentially scanned, i.e. "interpreted", in order to determine whether the rule contains a variable and/or other value applicable to a task being performed. A compiled knowledge base, on the other hand, is structured so that the applicability of the variables and other values are known, thereby eliminating the need to sequentially scan each rule. An analogy to the difference between an interpreted and a compiled knowledge base is the text and the topic index of a book. Without the topic index, in order to determine where a particular topic is addressed, the entire book must be scanned, i.e. interpreted. This first situation is analogous to an "interpreted" knowledge base. With a topic index, however, the exact location of where a particular topic is addressed is already known, and the reader can go directly to that location for the particular information. This second situation is analogous to a compiled knowledge base. It should be readily understood, therefore, that with the "interpreted" knowledge base of the above-described reasoning system, the time period required for the system to provide the requested information generally inhibits its real-time operation. Also, the above-described system requires a large memory space which limits the portability of the system. The required memory space prevents utilization of the system in environments having strict weight and space requirements, such as in tactical aircraft.

Moreover, in order to most effectively and efficiently operate in real-time, features which facilitate reasoning within certain time restraints are desirable. Such features include an asynchronous interface between an application program and the reasoning system and having the system recognize external and/or internal interrupts, prioritize tasks and execute tasks within a specified amount of time. Other features also are desirable for real-time operation of the reasoning system.

It is therefore an object of the present invention to provide an automated, real-time reasoning system that is not subject to the aforementioned problems and disadvantages and satisfies the requirements for real-time operation.

SUMMARY OF THE INVENTION

The present real-time reasoning system comprises a knowledge base compiler, an execution unit and a system interface. The knowledge base compiler receives, as input, a knowledge base earlier developed, such as the above-described knowledge base developed by the reasoning system described in U.S. patent application Ser. No. 103,465. The knowledge base compiler first translates the input knowledge base into directed acyclic graph form wherein the rule premises and the rule conclusions are represented as nodes. The graph is "directed" in that each node which forms part of the graph includes a pointer which points to another node therefore establishing a "flow pattern". Also, although each rule predicate is represented as a node on the graph, the actual calculation or function of each predicate is stored in a separate, dedicated file. Pointers are provided which identify the calculation in the file which corresponds to each predicate. The graph also is "acyclic" in that the graph does not contain any loops. By representing the knowledge base in the direct acyclic graph form, the time period required to provide a conclusion to a system user is greatly reduced when compared to the time required by an "interpreted" structure.

Once the knowledge base has been translated, the directed acyclic graph is written, by the compiler, to an output file. The compiler may write the graph to the output file, for example, in C or LISP computer languages. The output file could, however, be in the form of one of many computer languages. Once in the output file, each node is fired, i.e. each individual rule predicate and rule conclusion is fired, and the execution time required for the calculation corresponding to each element is also stored in a dedicated execution-time file.

The execution unit of the present real-time reasoning system comprises a knowledge representation portion, an inference portion, and a control portion. Specifically, the knowledge representation portion of the present invention utilizes the compiled knowledge base stored in the output file and generates the value certainty interval. The representation portion additionally represents a sufficiency factor and necessity factor associated with each rule. The inference portion computes the premise certainty interval from the value certainty intervals, computes the conclusion detachment interval, computes the conclusion aggregation certainty interval, and computes the consensus certainty interval. The control portion receives, as input, the dedicated execution-time file to control operation of the system within time limits. The control portion also selects computational functions in accordance with which the value certainty interval associated with each assigned value is propagated through the system. The system interface of the present system efficiently transfers information from the system to the system user. Generally, the system interface is coupled to a user application program.

From the foregoing discussion, it should be understood that the present real-time reasoning system utilizes features such as T-norms and T-conorms for reasoning with uncertainty as described in U.S. patent application Ser. No. 103,465, and also includes other features, such as a streamlined knowledge base, so that the system can be utilized in real-time operation.

The present real-time reasoning system further includes automatic rule instantiation for updating each variable value, means for reviewing the state of elements for indicating whether the value of the element can be fetched or should be recomputed due to changes or obsolescence, asynchronous processing, prioritizing of tasks, individual processing, interrupts, and planning execution to meet time deadlines. These features provide that the present reasoning system will effectively and efficiently operate in real-time and may be utilized in many environments to provide useful and timely information to the system user.

BRIEF DESCRIPTION OF THE DRAWINGS

These and other objects of the present invention, together with further features and advantages thereof, will become apparent from the following specification when read together with the accompanying drawings, in which:

FIG. 3 is a rule predicate table used in conjunction with the directed acyclic graph shown in FIG. 2 in accordance with the present invention;

DESCRIPTION OF THE INVENTION

The present invention is directed to a system architecture and method for practicing reasoning with uncertainty on a computer, and the present invention is not directed to any particular set of rules for carrying out a particular reasoning process. Rather, the present invention is directed to an inventive structure for a real-time rule-based reasoning system and method for representing and propagating uncertainty information through the system.

Figure 1:
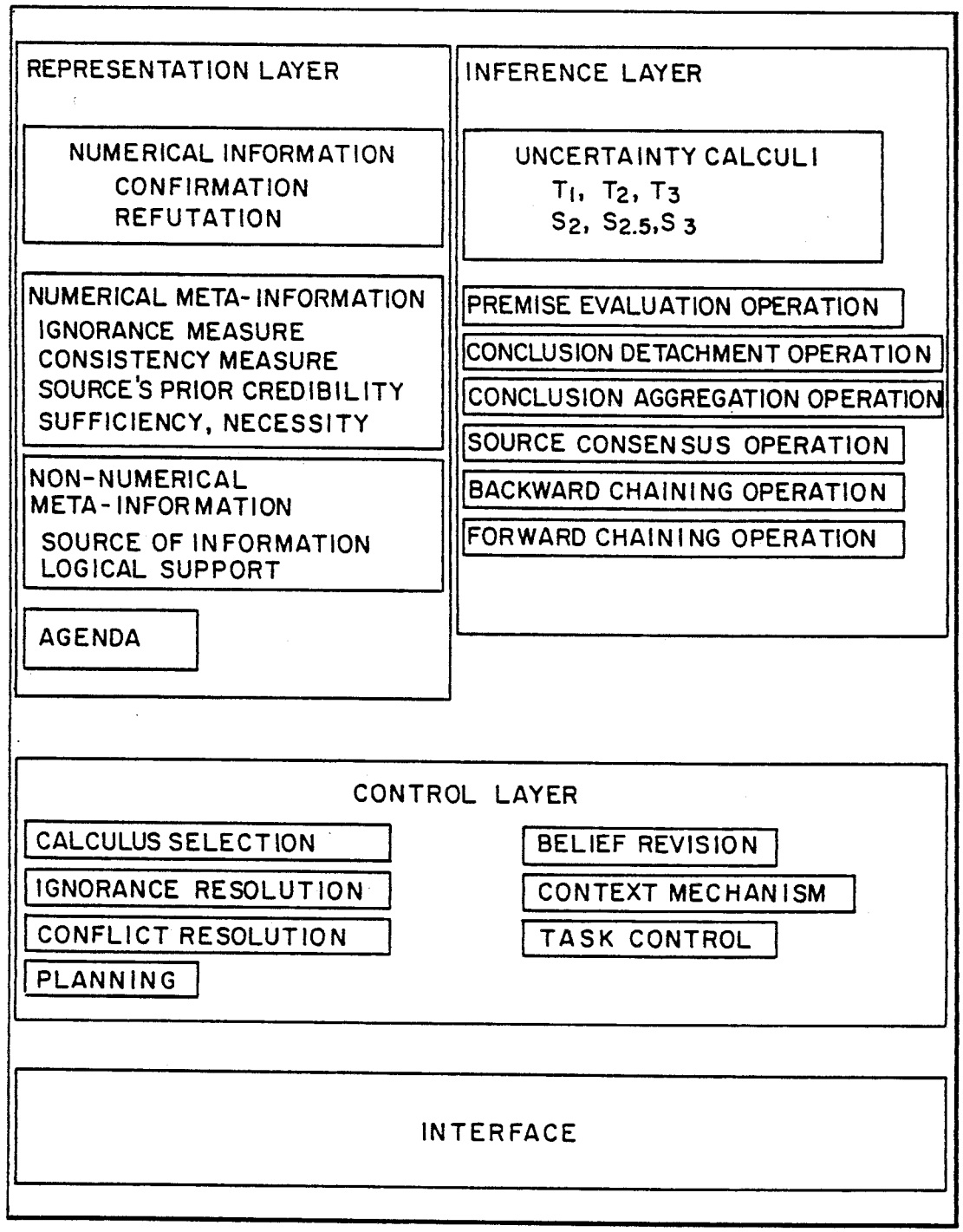
FIG. 1 illustrates a real-time reasoning with uncertainty system in accordance with the present invention.

Specifically referring to FIG. 1, the present real-time reasoning system is preferably configured to have a four-layer structure comprising a representation layer, an inference layer, a control layer and an interface layer. This four-layer structure is illustrated in FIG. 1 with various characteristics of each layer also being indicated, each such characteristic being described in detail hereinbelow. Briefly, the representation layer carries uncertainty information, germane to the reasoning process, that is available to the system user. Such information may be user provided and be the basis for determinations by the system regarding the nature of computations to be performed. The inference layer uses uncertainty information carried in the representation layer to perform the reasoning computations of the system. The control layer also uses uncertainty information contained in the representation layer to control the nature of the computations performed in the inference layer. The interface layer couples the reasoning system to an "outside" system, such as to an application program.

Figure 2:
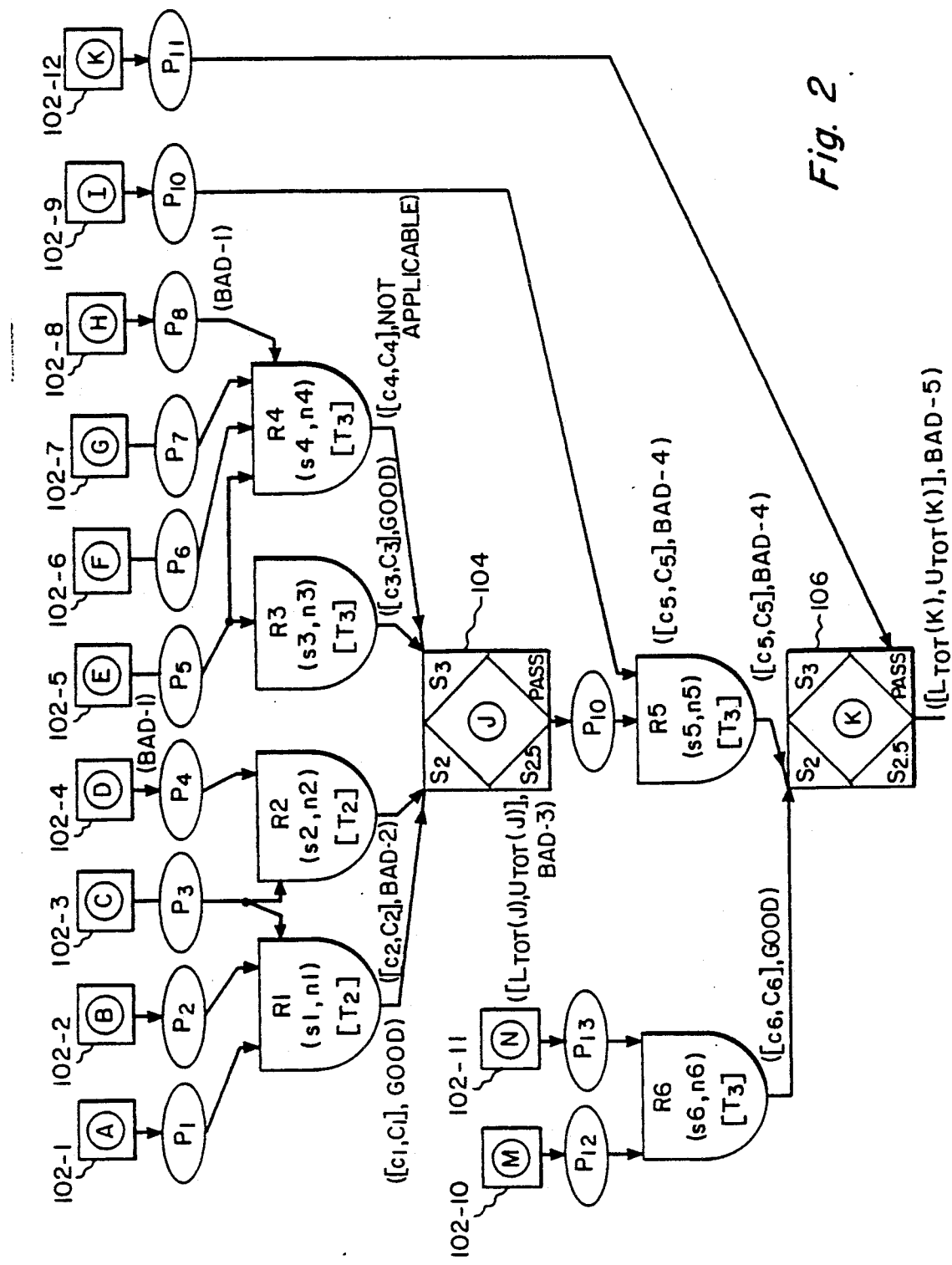
FIG. 2 is a directed acyclic graph of an exemplary rule-based reasoning system practiced in accordance with the system described in FIG. 1.

FIG. 2 illustrates a directed acyclic graph of an automated real-time rule-based reasoning system 100 in accordance with the present invention. System 100 comprises six rule conclusions designated R1 through R6. As is the case in such reasoning systems, each rule is anteceded by a premise P1–P13.

In the directed acyclic graph shown in FIG. 2, each rule R1–R6 and each rule premise P1–P13 is represented as a node. A pointer (not shown) is associated with each rule premise node and points to the corresponding predicate and function in a dedicated predicate table, such as the table shown in FIG. 3. The pointer generally comprises a first memory location having a second memory location stored therein. The second memory location indicates where the predicate function is stored. In the dedicated predicate table, each predicate P1–P13 includes functions F1–F13 for performing operations to provide a value. Specifically, a value must be assigned to each variable in order to evaluate the rule premise. As also shown in FIG. 3, each predicate also is associated with a time unit which indicates the number of time units required to perform the respective function. These time units, as hereinafter explained, are determined by the complier and utilized in planning.

FIG. 2 further illustrates a plurality of variables 102-1 through 102-11, represented as boxes, associated with the rules. The circled letter within each box, i.e. A,B,C, etc., symbolizes assignment of a value to the variable. In FIG. 2, variables are illustrated as utilized for two different purposes. Variables indicated as being applied to the top flat portion of a rule symbol, e.g. variables 102-1 and 102-2 applied to rule R1, are variables contained in the rule premise. Variables indicated as applied to the left or right side (as viewed in FIG. 2) of a rule symbol, e.g. variable 102-3 applied to rules R1 and R2, are available to the rule for determining the presence or absence of a context within which the rule may or may not be fired. This context limitation on rule firing feature is described in greater detail below.

A conclusion 104 to be drawn from the firing of one or more of the rules R1 through R4, in a manner more fully described below, is also indicated by a box. An exemplary value of the conclusion is indicated by the circled letter "J". Conclusion 104 is also seen to be an intermediate conclusion in system 100 and is, further, a variable in a premise clause of rule R5. A conclusion 106 is drawn from the firing of one or both of rules R5 and R6. An exemplary value of conclusion 106 is indicated by the circled letter "K". It is preferred herein that each rule be carried in the representation layer so as to be represented to the user, where the rule representation comprises the rule premise clauses, conclusion and firing context limitations.

A certainty interval is associated with each value of a variable, whether that variable is a conclusion, e.g. conclusions 104 or 106, or that variable is at the boundary of the reasoning system, e.g. variables 102-1 through 102-11. In the case of variables, the values of which are determined by firing rules, e.g. conclusions 104 or 106, the respective certainty intervals of the values assigned to such variables are computed in a manner as more fully described below. With respect to the values of variables at the system boundary, the certainty interval for each is specifically designated a value certainty interval, such value certainty intervals being assigned on the basis of an understanding of the source of each value. Thus, upon initially configuring the rules and associated variables of the reasoning system, a qualitative assessment is made of the source of values for each variable and, based on each source assessment, a value certainty interval is determined for the values derived from the source. Some of the qualitative, non-numerical information characterizing each source is also stored in the portion of the representation layer designated "Non-Numerical Meta-Information". Such information is characterized in FIG. 1 as "Source of Information" and "Logical Support". This information is accessed by the control layer, as described hereinbelow, as part of that layer's function, referred to as calculus selection, of determining the nature of the computations performed by the inference layer.

Figure 4:
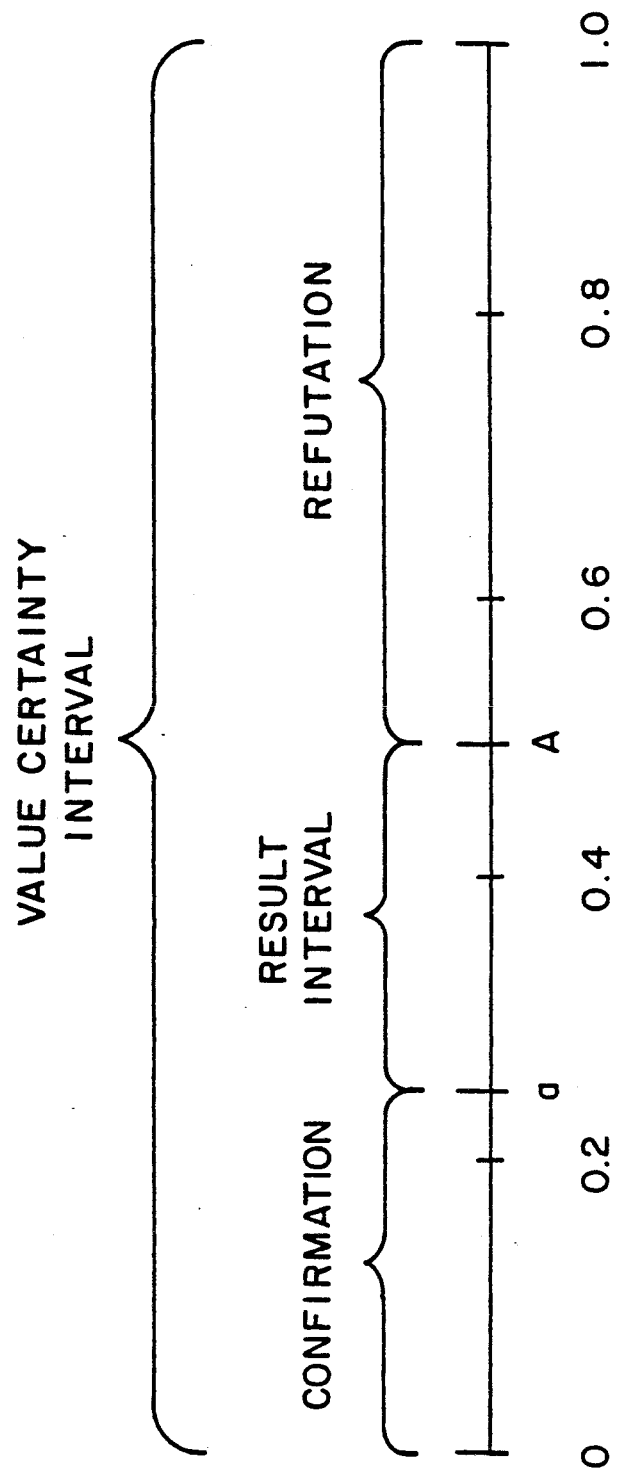
FIG. 4 illustrates a value certainty interval employed in the practice of the present invention.

The value of the certainty interval, having a value range of 0 to 1.0, has the form [a,A] where "a" and "A" are respectively the lower and upper bound for the certainty that the value assigned to the variable is believed to be true. FIG. 4 illustrates a representation of the value certainty interval on a 0 to 1.0 scale with the exemplary values of 0.25 and 0.5 being illustrated for "a" and "A", respectively. The portion of the interval between 0 and the interval lower bound "a", hence the valu "a", numerically represents the amount of confirmation of the truth of the value represented by the interval. The upper bound "A" numerically represents the failure of refutation of the truth of the value represented by the interval. The portion of the interval between the upper bound "A" and 1.0, i.e. 1-A, therefore represents the amount of refutation, or doubt, of the truth of the value. As an example, if there is absolute certainty that a particular value is true, then $a=A=1.0$, while if there is absolute refutation of the value's truth, then $a=A=0$. As a further example, the value "heads" assigned to a random coin toss result variable would be represented by a certainty interval for which $a=A=0.5$, since there are equal amounts of confirmation and refutation of the value "heads".

The portion of the value certainty interval between "a" and "A" is designated the result interval and its breadth represents the amount of ignorance about the truth of the value. That is, the width of the result interval represents the extent to which the truth of the value can neither be confirmed nor refuted. For example, in the case where there is no confirmation and no refutation of the truth of the value, the interval [a,A] is [0,1]. Therefore, the result interval spans the entire value certainty interval and represents total ignorance about the truth of the value. As a further example, considering the above coin toss situation where the value is "heads" $[a,A]=[0.5,0.5]$, there is no ignorance as to the certainty of the truth of the value. This value certainty interval is utilized in both the present invention and in the system described in U.S. patent application Ser. No. 103,465.

To further facilitate understanding of the value certainty interval, the interval [0, 1.0] of FIG. 4 may be defined as the interval $I=[0, 1.0]$, and may be decomposed into three sub-intervals, $I1=[0,a]$, $I2=[a,A]$, and $I3=[A, 1.0]$ which are respectively labeled "confirmation", "result interval", and "refutation", as shown. The length of sub-interval $I1=[0,a]$ is a measure of the amount of positive evidence which exists for the belief that a variable is true. The length of this sub-interval is $a-0=a$. Thus, the value "a" numerically represents the minimal amount of confirmation of the truth of the value represented by the interval. The larger the distance between 0 (the lower bound of the value range) and "a" (the lower bound of the certainty interval) the stronger is the certainty that the value assigned to the variable is believed to be true.

Sub-interval $I2=[a,A]$ is, as indicated in FIG. 4, the result interval. The length of this sub-interval is a measure of the amount of ignorance as to the truth of the variable. The length of this sub-interval is $A-a$, and this distance between the value "a" and "A" numerically represents the amount of indetermination of the truth of the value represented by the interval, i.e., the amount of ignorance as to the truth. The larger the distance, the smaller is the amount of available information and, hence, the smaller is the certainty that the value assigned to the variable is believed to be either true or false.

Sub-interval $I3=[A, 1.0]$, is the "refutation" interval. The length of sub-interval I3 is $1.0-A$, and is a measure of the amount of negative evidence as to the truth of the value represented by the interval, i.e., the "refutation" of the truth of the value. The larger the distance between "A", the upper bound of the certainty interval, and 1.0, the upper bound of the value range, the stronger is the certainty that the value assigned to the variable is believed to be false.

Thus, as shown in FIG. 4, "a" represents the minimal amount of confirmation, "A" represents the maximal amount of confirmation which is the sum of minimal confirmation and ignorance, and "(1−A)" represents the minimal amount of refutation or doubt. Since it is the length of the sub-interval between "A" and 1.0 which measures refutation, the value of "A" represents not only the maximal amount of confirmation, it also represents the amount by which refutation has failed. Stated another way, if "(1−A)" represents the amount of refutation or doubt, "A" represents the "failure of refutation" or doubt.

Referring again to FIG. 1, the confirmation and refutation of each value as determined from its value certainty interval is listed in a "Numerical Information" portion of the representation layer. As stated above, the value certainty interval for each value is determined on the basis of information about the source of the value. For example, if the variable is a blood test result, the value certainty interval associated with the test result value would reflect experience with the reliability of previous test results. Note that some of this information may be appropriate for inclusion as "Numerical Meta-Information" in the representation layer since it relates to the source's prior credibility. As a further example, if the variable is the distance of a target as determined by radar apparatus, the value certainty interval would reflect previous experience with the accuracy of the distances so determined as well as, e.g., malfunctions previously experienced with the apparatus that resulted in entirely false distance values.

As can be seen, in many cases the selection of the value interval ultimately rests on a human assessment of prior experience and is therefore subjective. As is known in the art, in the case of constructing reasoning systems, such subjective assessments derive from extensive questioning of one or more experts. These subjective assessments can be elicited in either numerical or linguistic form. While the real-time reasoning with uncertainty system may be practiced with assessments of uncertainty elicited in either numerical or linguistic form, the latter is preferred herein. Linguistic assessment is preferred because of the observation that people more readily and consistently provide assessments in a qualitative form as opposed to a precise numerical form, this topic being discussed in the paper "Categorical and Probabilistic Reasoning in Medical Diagnosis" by P. Szolovits et al., Artificial Intelligence Journal, Volume 11, 1978, pp. 115–144.

Having selected the use of linguistic assessment, it remains to specify the uncertainty granularity of the linguistic term set and whether crisp or fuzzy number representations are correlated to the linguistic assessments and used in the computations described hereinbelow. Uncertainty granularity as used herein refers to the number of linguistic terms used to described the full range of possible assessments of confirmation and refutation. For example, the linguistic assessments at the extreme ends of such a range may be: "impossible" and "certain", while interim assessments may be "unlikely" and "likely". Obviously, the greater the number of terms in the term set, the finer the uncertainty assessment granularity that can be achieved. Such term sets containing 5,9 and 13 terms have been described in detail in the paper entitled "Selecting Uncertainty Calculi and Granularity: An Experiment in Trading-Off Precision and Complexity" by Bonissone et al., Uncertainty in Artificial Intelligence edited by L. Kanal and J. Lemmer, North-Holland, 1986, pp. 217-247 (Bonissone et al.), which is incorporated herein by reference. The reasoning with uncertainty system of the present invention is readily practiced with terms sets having granularities such as disclosed in Bonissone et al.

Once the term set granularity is selected, the correlation of numerically crisp of fuzzy values to the linguistic terms remains. Correlations between numerical values of certainty and linguistic assessments are known in the art. Crisp as used herein and known in the art refers to the use of discrete numerical values to represent the subjective assessments. For example, the exemplary value certainty interval illustrated in FIG. 4 is defined in terms of crisp values of confirmation and refutation. Correlations between linguistic assessments and such crisp value representations are known, an exemplary system of five linguistic assessments and corresponding crisp numerical values being provided below in Table I.

TABLE I

| Linguistic Assessment | Crisp Numerical Value |
|---|---|
| impossible | 0 |
| unlikely | 0.25 |
| maybe | 0.50 |
| likely | 0.75 |
| certain | 1.0 |

The practice of the real-time reasoning with uncertainty system is described hereinbelow assuming the use of such crisp value representations of certainty intervals. In an alternate embodiment, the use of fuzzy number representations of the certainty intervals is possible.

Uncertainty factors are associated with each rule. Specifically, a sufficiency factor "s" and a necessity factor "n" are determined at the time the system is designed based on available information, such as from the expert(s) providing input to the system design. The concepts of sufficiency and necessity will not be described in detail herein since they are well known in the art. Simply characterized, the sufficiency factor "s" is a numerical answer, or quantifiable linguistic assessment, on the interval [0,1], to the questions: If the premise of the rule is true, how strongly is the conclusion of the rule believed to be true? The sufficiency factor "s" ranges from 0 to 1 as the answer ranges from no truth belief strength to absolute truth belief strength. The necessity factor "n" is the numerical answer, or quantifiable linguistic assessment, on the interval [0,1], to the question: If the premise of the rule is false, how strongly is the rule conclusion believed to be false? Thus, for $n=0$, there is no belief that the conclusion is false given the premise is false, and conversely, for $n=1$, there is absolute belief that the conclusion is false given the rule premise is false. Note that in elicting values for "s" and "n" from an expert, the above questions are posed with the rule premise in each case hypothesized to be absolutely true or false. That is, in posing the question, there is no uncertainty attached to the rule premise. A value for "s" and "n" associated with each rule of exemplary reasoning system 100 is illustrated in FIG. 2 by the factors "s#" and "n#" for each rule R# for #=1 to 6.

The sufficiency and necessity factors associated with each rule are contained in the system knowledge base and represented to the user in the system representation layer with the associated rule.

Having defined a value certainty interval for each value assigned to a variable at the system boundaries and having further defined a sufficiency and necessity factor for each rule, there remains a need for a conjunction operator and a disjunction operator. The conjunction operator is required for aggregating the value certainty intervals of the clauses of a rule premise and for determining the certainty interval of the conclusion of a rule in view of the sufficiency and necessity prescribed therefor (the latter determination being referred to hereinbelow as a conclusion aggregation operation). Triangular norm and triangular conorm functions have been adapted for use as the conjunction and disjunction operators, respectively, and are collectively referred to herein as the uncertainty calculi.

The triangular norm (T-norm) and triangular conorm (T-conorm) functions are general families of binary functions that satisfy the requirements of the conjunction and disjunction operators, respectively. T-norms and T-conorms are two-place functions from $[0,1] \times [0,1]$ to $[0,1]$ that are monotonic, commutative and associative. Their corresponding boundary conditions, i.e. the evaluation of the T-norms and T-conorms at the extremes of the [0,1] interval, satisfy the truth tables of logical AND or OR operators. One parametrized family of T-norms and T-conorms described in the paper "Associative Functions and Abstract Semi-Groups" by Schweizer et al., Publicationes Mathematicae Debrecen, Volume 10, 1963, pp. 69-81 had been adapted for use in the real-time reasoning with uncertainty system of the present invention. The family of T-norms described in that paper is denoted by $T_{Sc}(a,b,p)$ where the conjunctive function performed by the T-norm on the arguments "a" and "b" varies in accordance with the parameter "p". In varying parameter "p" from $-\infty$ to $\infty$, a set of six T-norms, most having utility in the practice of the present invention, is provided, those six T-norms $T_i(a,b)$ being designated $T_0$, $T_1$, $T_{1.5}$, $T_2$, $T_{2.5}$, and $T_3$. Generally, in accordance with equations (1a)-(1d) below:

$$T_{Sc}(a,b,p) = (a^{-P} + b^{-P} - 1)^{-1/p} \text{ if } (a^{-P} + b^{-P}) \geq 1 \quad (1a)$$
$$\text{when } p < o$$

$$T_{Sc}(a,b,p) = o \qquad \text{if } (a^{-P} + b^{-P}) < 1 \quad (1b)$$
$$\text{when } p < o$$

$$T_{Sc}(a,b,o) = ab \qquad \text{for Lim } T_{Sc}(a,b,p) \quad (1c)$$
$$p \rightarrow o$$

$$T_{Sc}(a,b,p) = (a^{-P} + b^{-P} - 1)^{-1/p} \text{ when } p > o \quad (1d)$$

The six norms $T_0$, $T_1$, $T_{1.5}$, $T_2$, $T_{2.5}$ and $T_3$ correspond to the $T_{sc}(a,b,p)$ of Schweizer et al. as a function of parameter p, and perform operations, as illustrated in the following Table II.

TABLE II

| Selected Value of p | $T_i(a,b)$ | Operation Performed By $T_i(a,b)$ |
|---|---|---|
| Lim $T_{Sc}(a,b,p)$<br>$p \rightarrow -\infty$ | $T_0(a,b)$ | = min (a,b) if max (a,b) = 1<br>= 0 otherwise |
| $T_{Sc}(a,b,-1)$ | $T_1(a,b)$ | max (0, a + b - 1) |
| $T_{Sc}(a,b,-0.5)$ | $T_{1.5}(a,b)$ | max $(0, a^{0.5} + b^{0.5} - 1)^2$ |

TABLE II-continued

| Selected Value of p | $T_i(a,b)$ | Operation Performed By $T_i(a,b)$ |
|---|---|---|
| $\lim_{p \to 0} T_{Sc}(a,b,p)$ | $T_2(a,b)$ | $ab$ |
| $T_{Sc}(a,b,1)$ | $T_{2.5}(a,b)$ | $(a^{-1} + b^{-1} - 1)^{-1}$ |
| $\lim_{p \to \infty} T_{Sc}(a,b,p)$ | $T_3(a,b)$ | $\min(a,b)$ |

Each T-norm operator $T_i(a,b)$ is a conjunction operator and satisfies the conditions:

$T_i(0,0) = 0$ [boundary condition]

$T_i(a,1) = T_i(1,a) = a$ [boundary condition]

$T_i(a,b) \leq T_i(c,d)$ if $a \leq c$ and $b \leq d$ [monotonicity condition]

$T_i(a,b) = T_i(b,a)$ [commutativity condition]

$T_i(a,T_i(b,c)) = T_i(T_i(a,b),c)$ [associativity condition]

Although defined as two place function, a T-norm can be used to represent the conjunction of a large number of clauses in a premise. Because of the associativity of the T-norms, it is possible to define recursively $T(x_1, \ldots, x_n, x_{n+1})$, for $x_1, \ldots, x_{n+1} \epsilon [0,1]$ as:

$$T(x_1, \ldots, x_n, x_{n+1}) = T(T(x_1, \ldots, x_n), x_{n+1}).$$

In accordance with Schweizer et al., the T-conorm designated $S_{Sc}(a,b,p)$ is defined in equation (2) as:

$$S_{Sc}(a,b,p) = 1 - T_{Sc}(1-a, 1-b, p). \quad (2)$$

The T-conorm disjunction operator defined for use herein is simply $S_i(a,b)$ and is related to $T_i(a,b)$ in accordance with DeMorgan's Law as described in equations (3) and (4) as follows:

$$S_i(a,b) = N(T_i(N(a),N(b))), \quad (3)$$

and $$T_i(a,b) = N(S_i(N(a),N(b))), \quad (4)$$

where N is the negation operator such that $N(\alpha) = 1 - \alpha$. In view of this relationship between the T-norm operators $T_i$ and T-conorm operators $S_i$, programming of a real-time reasoning system may be simplified by expressing all operators exclusively in terms of either the T-norm of T-conorm operators.

The operations performed by the T-conorms $S_i(a,b)$ and their correspondence to the T-conorms $S_{Sc}(a,b,p)$ of Schweizer et al. are summarized below in Table III.

TABLE III

| Selected Value of p | $S_i(a,b)$ | Operation Performed By $S_i(a,b)$ |
|---|---|---|
| $\lim_{p \to -\infty} S_{Sc}(a,b,p)$ | $S_0(a,b)$ | $= \max(a,b)$, if $\min(a,b) = 0$ <br> $= 1$ otherwise |
| $S_{Sc}(a,b,-1)$ | $S_1(a,b)$ | $\min(1, a+b)$ |
| $S_{Sc}(a,b,-0.5)$ | $S_{1.5}(a,b)$ | $1 - \max(0,[(1-a)^{0.5} + (1-b)^{0.5} - 1])^2$ |
| $\lim_{p \to 0} S_{Sc}(a,b,p)$ | $S_2(a,b)$ | $a + b - ab$ |
| $S_{Sc}(a,b,1)$ | $S_{2.5}(a,b)$ | $1 - [(1-a)^{-1} + (1-b)^{-1} - 1]^{-1}$ |
| $\lim_{p \to \infty} S_{Sc}(a,b,p)$ | $S_3(a,b)$ | $\max(a,b)$ |

As stated above, the T-conorm $S_i(a,b)$ is the disjunction operator and satisfies the conditions:

$S_i(1,1) = 1$ [boundary condition]

$S_i(0,a) = S_i(a,0) = a$ [boundary condition]

$S_i(a,b) \leq S_i(c,d)$ if $a \leq c$ and $b \leq d$ [monotonicity condition]

$S_i(a,b) \leq S_i(b,a)$ [commutativity condition]

$S_i(a,S_i(b,c)) = S_i(S_i(a,b),c)$ [associativity condition]

A T-conorm can be extended to operate on more than two arguments in a manner similar to the extension for the T-norms. By using a recursive definition, based on the associativity of the T-conorms, it is possible to define:

$$S_i(y_1, \ldots, y_m, y_{m+1}) = S_i(S_i(y_1, \ldots, y_m), y_{m+1})$$

for $y_1, \ldots, y_{m+1} \epsilon [0,1]$. Together the T-norms and T-conorms compose the uncertainty calculi available for performing computations to propagate uncertainty through a reasoning system.

The different T-norms that can be selected for the rule premise evaluation and conclusion detachment operations reflect different attitudes toward the evaluation of uncertainty. For example, with respect to premise evaluation, given a rule with two premise clauses each having a variable with an assigned value and associated value certainty interval, three different attitudes, defined herein, may be assumed toward the conjunction of the certainty intervals associated with the two values. A first attitude is that the two values are mutually exclusive of one another. The conjunction operation performed by the T-norm $T_1$ (See Table II) expresses the mutual exclusivity attitude. Such an attitude reflects a conservative approach to evaluating uncertainty. A second attitude is that the two values are independent of one another. The conjunction operation performed by T-norm $T_2$, which simply multiplies uncertainty values directly, reflects an attitude corresponding to probabilistic independence. A third attitude is that one of the two values entirely subsumes the other. The $T_3$ conjunction operation best reflects this attitude which corresponds to a relatively nonconservative attitude toward evaluating uncertainty. The same attitudes are applicable to the T-norm selection for the conclusion detachment operation. Note that for the embodiments described herein, only the three T-norms $T_1$, $T_2$ and $T_3$ are utilized. The intermediate values $T_{1.5}$ and $T_{2.5}$ can be used to achieve a finer granularity in reflecting user attitude toward uncertainty evaluation. No utility is found in applying T-norm $T_0$ due to its drastic behavior and lack of continuity.

A simple example is now provided to further illustrate the nature of these attitudes toward uncertainty evaluation and their respective expressions through the T-norms $T_1$, $T_2$ and $T_3$. The problem posed is derived, in part, from "A Computational Approach to Fuzzy Quantifiers in Natural Languages" by Zadeh, Computer & Mathematics with Applications, Volume 9, No. 1, 1983, pp. 149-184. The example is stated as the problem: If 30% of the students in a college are engineers, and 80% of the students are male, how many students are both male and engineers? As can be seen, the answer may range in an interval between 10-30%. A lower bound to the answer is represented by the conservative, mutual exclusivity attitude and thus provided by $T_1(0.3,0.8)$. Given the attitude of mutual exclusivity, only 10% of the students are concluded to be both engineers and male. Recall from Table II that $T_1(0.3,0.8) = \max(0, 0.3 + 0.8 - 1) = 0.1$. At the other extreme, if the nonconservative subsumption attitude is taken, i.e. one value subsumes the other, then the answer is provided by $T_3(0.3,0.8)$. That is, 30% of the students that are engineers are subsumed in the 80% that are male and the answer is 30%. Referring again to Table II, $T_3(a,b) = \min(a,b)$ so that $T_3(0.3,0.8) = \min(0.3, 0.8) = 0.3$.

Finally, if the two values are considered independent of one another, reflecting an attitude that is intermediate the above two attitudes, a result that is intermediate the above two results is obtained by applying $T_2(0.3,0.8)$. Again from Table II, $T_2(a,b) = ab$, so that $T_2(0.3,0.8) = 0.3 \times 0.8 = 0.24$. The correlation between attitude toward uncertainty evaluation and T-norm is summarized below in Table IV.

TABLE IV

| T-Norm | Attitude Toward Uncertainty Evaluation |
|---|---|
| $T_1$ | Conservative-mutual exclusivity |
| $T_2$ | Intermediate-independence |
| $T_3$ | Nonconservative-subsumption |

Given the attitudes toward uncertainty correlated to the uncertainty calculi T-norms $T_1$, $T_2$ and $T_3$, the appropriate T-norms may be selected or adjusted by the system user in advance of system use. Additional utility may be realized where the user is optionally enabled to change the selected calculi during system operation. Alternatively, since the attitude toward uncertainty relating to the premise evaluation or conclusion detachment operations may be based on an assessment of information source credibility, the control layer may be programmed to select the appropriate uncertainty calculus for some such operations, for use by the inference layer, based on the non-numerical source credibility meta-information stored in the representation layer. The source credibility assessment is preferably based on a limited set of descriptive terms to enable such programming of the control layer.

With respect to the T-conorm disjunction operators, three in particular are selected as available for use herein in the conclusion aggregation operation. These three $S_2$, $S_{2.5}$ and $S_3$ correspond to different attitudes toward the relation between the conclusions being aggregated. As noted above, the conclusion aggregation operation is performed when the same conclusion is provided by the firing of more than one rule and performs the disjunction of the certainty intervals associated with the respective conclusions. The conclusion aggregation operation determines the consolidated degree to which the conclusion is believed if supported by more than one rule. $S_2$ is used herein to perform the disjunction operation where there is a lack of correlation between the rules providing the same conclusion. Lack of correlation as used herein means that the rules provide their respective conclusions based on entirely independent, unrelated sources of information and/or reasoning. For example, if one rule reaches a particular medical diagnostic conclusion based on a blood test result, while another rule reaches the same diagnostic conclusion based on an electrocardiographic test result, the rules may be said to be uncorrelated. The disjunction operation is performed using $S_3$ for the opposite case in which positively correlated rules provide the same conclusion when those rules provide their respective conclusions based on the same or related sources of information. Using the above medical diagnostic example, if two rules reach the same diagnostic conclusion based on different results of the same blood test, then the rules may be said to be correlated. $S_{2.5}$ is used for situations deemed to fall between the two extremes addressed by use of the $S_2$ and $S_3$ disjunction operators.

As discussed above with respect to selection of T-norms, the appropriate T-conorms may be selected or adjusted by the user prior to system use. Further, given the non-numerical meta-information relating to the source of the information used for premise evaluation and rule firing, the control layer can be programmed to determine whether or not rules providing the same conclusion are correlated. On the basis of such a determination, the control layer can select the appropriate uncertainty calculus T-conorm for use by the inference layer in performing a conclusion aggregation operation.

Having defined value certainty intervals, sufficiency and necessity factors for each rule and conjunction and disjunction operators, the operations required to fire rules as well as aggregate common rule conclusions are described next. First, the process of rule premise evaluation is performed by computing a premise certainty interval designated [b,B]. The terms "b" and "B" are respectively the lower and upper bounds of the premise interval and are interpreted in the manner described with respect to the value certainty interval and illustrated in FIG. 2. Given a plurality of m clauses of the rule, i.e. m "If" statements, and a value assigned to a variable associated with each clause such that there are m value certainty intervals $[a_1, A_1]$ through $[a_m, A_m]$, then the premise certainty interval is defined as:

$$[b,B] = [T_i(a_1, a_2, \ldots, a_m), T_i(A_1, A_2, \ldots, A_m)] \quad (5)$$

As described above, the appropriate uncertainty calculus $T_i$ will have been selected, by the user or the control layer, to reflect an appropriate attitude toward uncertainty evaluation.

Next, the conclusion detachment operation is performed, this operation being the actual firing of the rule. The conclusion detachment operation yields a certainty interval designated the conclusion detachment interval [c,C] and defined as:

$$[c,C] = [T_i(s,b), N(T_i(n, N(B)))] \quad (6)$$

where "s" and "n" are respectively the rule sufficiency and necessity factors described above, "b" and "B" are respectively the lower and upper bounds of the premise certainty interval calculated in equation (5) and N is the negation operator (i.e. $N(\alpha) = 1 - \alpha$). The $T_i$ employed to fire each rule will have been selected by the user or the control layer to reflect the attitude toward uncertainty evaluation associated with firing that rule. In FIG. 2, a particular $T_i$ has been indicated for firing each of the rules R1 through R6. For example, the $T_3$ operator is noted for rule R4. The conclusion detachment interval [c,C] is interpreted for the rule conclusion in the same manner as the value certainty and premise certainty intervals.

The above described conclusion aggregation operation would next be performed as the disjunction operation on identical conclusions provided by different rules. In FIG. 2, rules $R_3$ and $R_4$ provide the same conclusion and conclusion aggregation is performed thereon using the $S_3$ operator. Similarly, rules $R_1$ and $R_2$ provide the same conclusion and the $S_2$ operator is selected to perform conclusion aggregation on those conclusions. As stated above, the selection, by the user or control layer, of the particular uncertainty calculus $S_i$ to perform conclusion aggregation reflects an attitude with respect to whether or not the rules providing the same conclusion are correlated. Performance of conclusion aggregation yields a certainty interval designated the conclusion aggregation interval [d,D] and defined as:

$$[d,D] = [S_i(c_1, c_2, \ldots, c_m), S_i(C_1, C_2, \ldots, C_m)] \quad (7)$$

where $[c_1, C_1]$ through $[c_m, C_m]$ are m conclusion detachment intervals corresponding to the same conclusion reached by m different rules.

In the process of initially configuring the rules, and conclusions derived therefrom, in a rule base system, it may be desirable to introduce a conclusion without subjecting it to the conclusion aggregation operation. Such a conclusion may derive from a source external to the system or from a rule firing within the system. This is accomplished by a "pass" function which simply operates to isolate the conclusion introduced thereby from the conclusion aggregation operation. This is illustrated in FIG. 2 with respect to conclusion 106 where a value "K" of a variable 102-12 at the system boundary is provided as input to determining conclusion 106 via the pass function. Therefore, while the conclusions provided by rules R5 and R6 are subjected to conclusion aggregation using the $S_2$ operator, the conclusion provided via the pass function is isolated from this operation. The "pass" function is associated in the knowledge base with the rule conclusion or variable being "passed" and this association is represented to the user in the representation layer.

If a conclusion is provided by the firing of only a single rule or if but a single conclusion aggregation operation is required to aggregate identical conclusions, then a conclusion is reached having a certainty interval given by the conclusion detachment interval or conclusion aggregation interval, respectively. However, in cases where the same conclusion is reached through more than one conclusion aggregation operation, as is the case of conclusion 104, and/or through introduction of the same conclusion through the pass function, as in the case of conclusion 106, a single certainty interval is not associated with the conclusion. In such a case, an additional source consensus operation is performed. The source consensus operation reduces the ignorance about the certainty of the conclusion by producing a source consensus interval that is always smaller than or equal to the smaller interval given by the separate sources providing the conclusion. Given a particular conclusion value Q that is reached by way of one or more conclusion aggregation operations and/or one or more pass functions, each source so providing the conclusion also provides a certainty interval associated therewith. Where there are m such certainty intervals, they may be generically represented as: $[L_1(Q), U_1(Q)]$, $[L_2(Q), U_2(Q)], \ldots, [L_m(Q), U_m(Q)]$, where $L_i(Q)$ and $U_i(Q)$ are respectively the lower and upper bounds of the certainty interval for the conclusion Q. The result of performing the source consensus operation is designated $[L_{tot}(Q), U_{tot}(Q)]$ and is determined by:

$$[L_{tot}(Q), U_{tot}(Q)] = [\text{Max } L_i(Q), \text{Min } U_i(Q)] \quad (8)$$

for $i = 1, 2, \ldots, m$. Thus, it is seen that the source consensus operation simply takes the intersection of the respective certainty intervals provided by the plural sources of the conclusion Q.

It is noted that the multiple sources contributing to a conclusion need not provide the same conclusion. For example, in FIG. 2, the aggregated conclusion derived from rules $R_1$ and $R_2$ may be entirely different from that derived from rules $R_3$ and $R_4$. For such a case, the control layer of the reasoning system of the present invention is programmed to select the rule having the certainty interval with the greatest amount of confirmation.

Figure 5A:
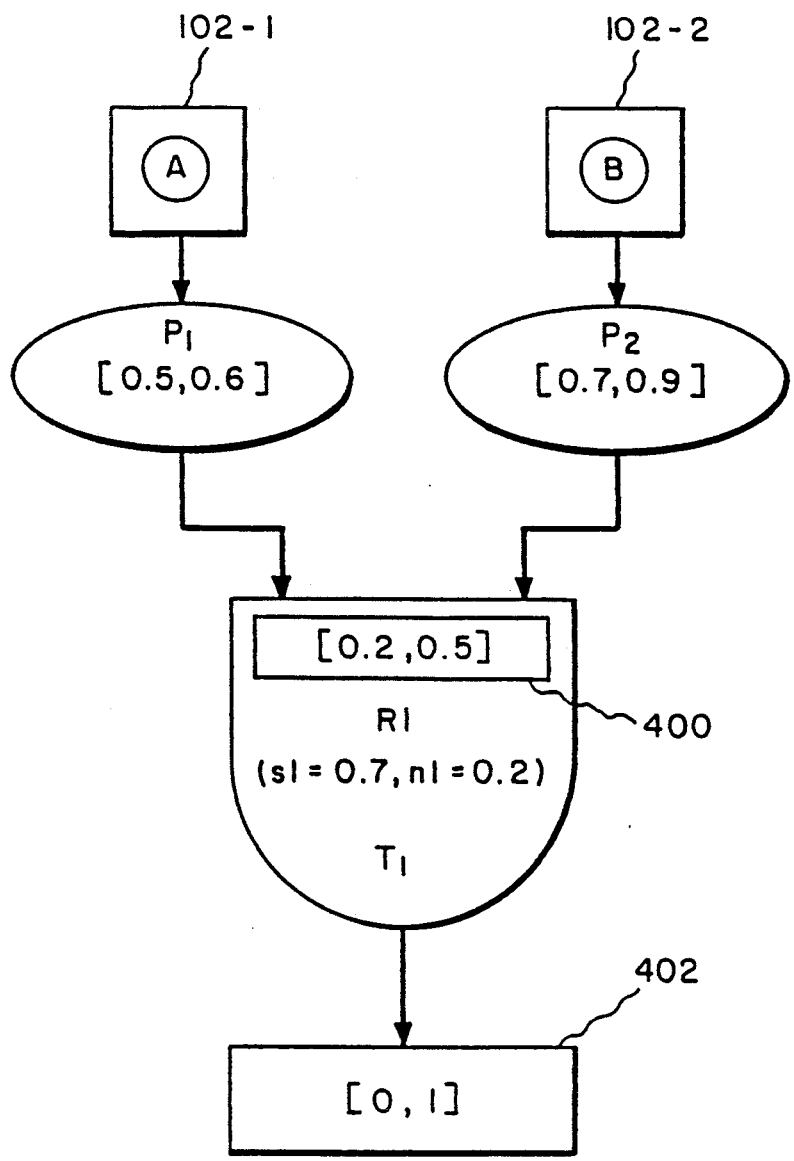
FIGS. 5a, 5b and 5c illustrate a numerical example showing the propagation of uncertainty through rule firing.
Figure 5B:
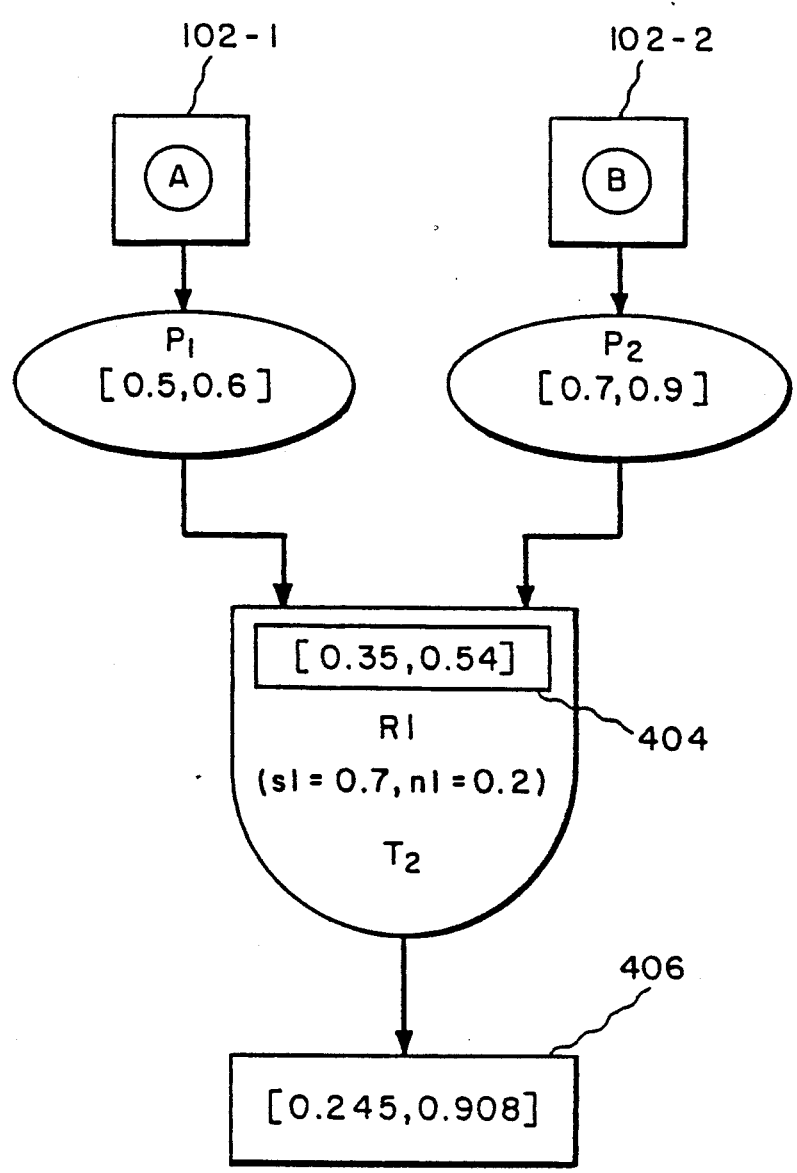
Figure 5C:
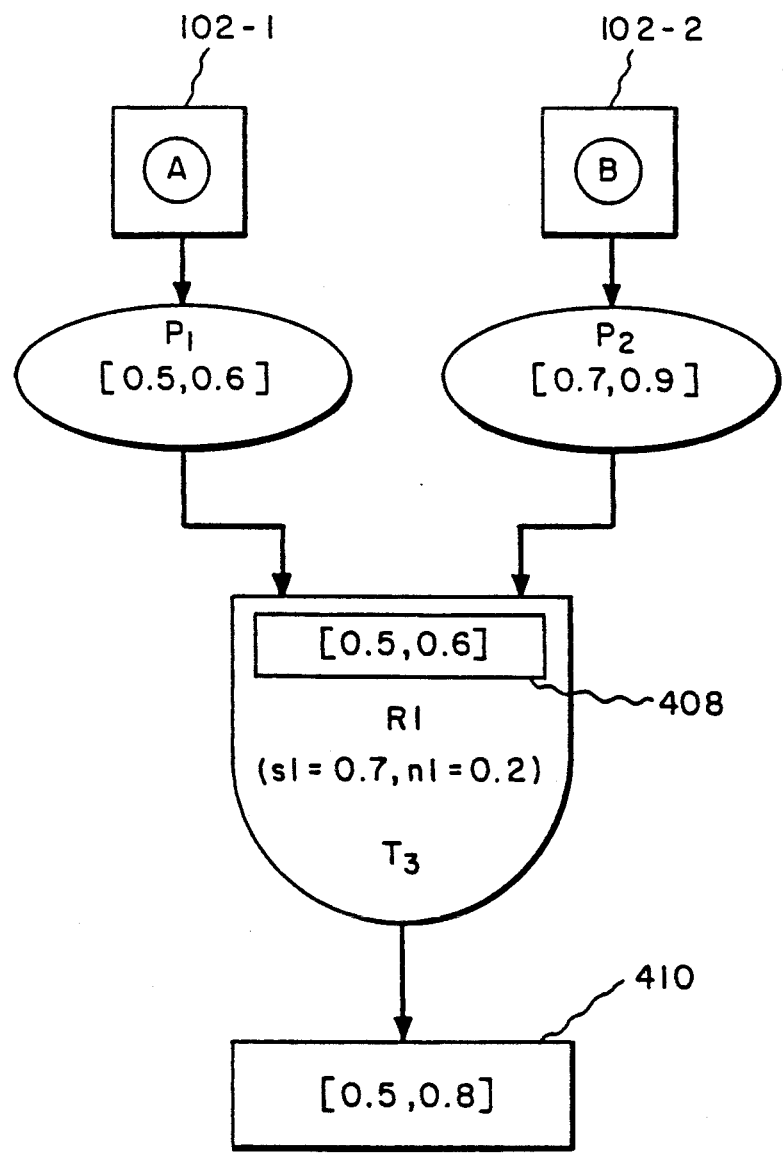

FIGS. 5a, 5b and 5c illustrate a brief numerical example of the above-described computations to determine the premise certainty and conclusion detachment intervals. In each of FIGS. 5a-5c, rule R1 is shown with the values "A" and "B" assigned to variables 102-1 and 102-2 respectively. Also in each FIG. 5a-5c, the value certainty intervals [0.5,0.6] and [0.7,0.9] are assigned to values "A" and "B", respectively. The same sufficiency and necessity factors $s1 = 0.7$ and $n1 = 0.2$ are also indicated for rule R1 in FIGS. 5a-5c. A different T-norm operator $T_1$ is shown in each FIG. 5a, 5b and 5c to indicate that $T_1$, $T_2$ and $T_3$ are respectively used in those Figures to determine both the premise certainty interval and the conclusion detachment interval.

Proceeding with the numerical example, referring to FIG. 5a, with the value certainty interval for the values of variables 102-1 and 102-2 being respectively designated $[a_1, A_1]$ and $[a_2, A_2]$, the premise certainty interval [b,B] is determined by applying the above described equation (5):

$$[b,B] = [T_1(a_1, a_2), T_1(A_1, A_2)].$$

Substituting the numerical values shown in FIGS. 4a-4c provides:

$$[b,B] = [T_1(0.5, 0.7), T_1(0.6, 0.9)].$$

Referring to Table II for the definition of $T_1$, to wit $T_1(a,b) = \max(0, a+b-1)$, premise certainty interval [b,B] is determined to be:

$$[b,B] = [0.2, 0.5]$$

this result being indicated in a box 400 in FIG. 5a.

Next, the conclusion detachment interval [c,C] is determined for rule R1 in FIG. 5a. Using equation (6) above to determine the conclusion detachment interval in this case, yields:

$$[c,C] = [T_1(s1, b), N(T_1(n1, N(B)))]$$

Substituting the appropriate numerical values into this equation results in:

$$[c,C] = [T_1(0.7, 0.2), N(T_1(0.2, N(0.5)))]$$

and by evaluating this expression, [c,C] is determined to be:

$$[c,C] = [0,1],$$

this result being indicated in a box in FIG. 5a.

The computations for application of the T-norms $T_2$ and $T_3$ in FIGS. 5b and 5c, respectively, are not described in detail herein. However, the computational results for the premise evaluation and conclusion detachment intervals are respectively shown in boxes 404 and 406 in FIG. 5b and respectively shown in boxes 408 and 410 in FIG. 5c. In reviewing the computed conclusion detachment intervals in FIGS. 5a–5c, it is noted that as $T_1$ ranges from $T_1$ to $T_3$, respectively representing an attitude toward uncertainty evaluation ranging from conservative to nonconservative (Table IV), the ignorance of the interval decreases while the amount of confirmation increases. It is thereby illustrated that use of the T1 operator reflects a conservative attitude in evaluating uncertainty while T3 reflects a relatively nonconservative attitude. In view of the numerical example illustrated in FIGS. 5a, 5b and 5c, the performance of the other computations required in order to practice the present invention should now be readily apparent to those skilled in the art.

Additional items of information are maintained in the representation layer as numerical meta-information. The first item is designated an "ignorance measure" (FIG. 1) and is simply the computed difference between the upper and lower bound of each certainty interval. As discussed with respect to the value certainty interval, that difference reflects the ignorance gap between the confirmation and refutation known about the value. Thus, an ignorance measure is maintained for each value certainty, premise certainty, conclusion detachment, conclusion aggregation and source consensus interval.

The second item also maintained in the representation layer is a "consistency measure" (FIG. 1) which assesses the result of each source consensus operation. In performing the latter operation, it is possible that there is no certainty interval that represents the intersection of the respective certainty intervals of the conclusions, i.e. there is no consistency among the respective certainty intervals of those conclusions. Such an absence of consistency among conclusions is referred to herein as the existence of "conflict". Thus, the consistency measure simply reflects the presence or absence of conclusion consistency. With respect to both the ignorance and consistency measures, the user is enabled to quickly assess those important characteristics of the rule-based reasoning process being conducted.

The knowledge representation portion also includes an agenda register to represent to the system all the tasks which should be done in the future. These tasks can either be reasoning tasks to conclude new facts, new facts to put into the knowledge base, or arbitrary functions to be executed. The tasks are inserted into a priority queue according to a static priority, which simply means that the priority for a task is computed once in order to put it into the priority queue, and will never be recomputed unless a function to prioritize the task is changed. The priority queue is then used in order to determine the relative importance of all the eligible tasks waiting to be executed. A default function based on the requestor's priority is also provided in the agenda register.

The priority for each task cannot be determined according to the time in which the request for priority is received. With two tasks having equal priority, however, then the task with the earliest time deadline, i.e. the absolute time at which the task must be completed, will be executed first. For illustrative purposes only, the following example is given to further explain task prioritization. The following table, Table V, is used to illustrate this example:

TABLE V

|         | Priority | Duration | Posted | Deadline   |
| ------- | -------- | -------- | ------ | ---------- |
| Task 1: | 1        | 20       | $t_o$  | $t_o + 20$ |
| Task 2: | 1        | 20       | $t_1$  | $t_1 + 20$ |
| Task 3: | 2        | 5        | $t_o$  | $t_o + 5$  |
| Task 4: | 2        | 1        | $t_1$  | $t_1 + 1$  |

Task 1 has a priority of "1", which for purposes of the example is the highest priority. Task 1 also requires twenty (20) time units to complete execution and therefore has a duration of 20. Task 1 was received, i.e. posted, at a time $t_o$, and the time deadline is twenty (20) time units subsequent to time $t_o$, i.e. $t_o+20$.

Task 2 also has a priority of "1" and a duration of 20. Task 2, however, was posted at a time $t_1$, subsequent to time $t_o$. The time deadline for Task 2 is twenty (20) time units subsequent to time $t_1$, i.e. $t_1+20$.

Since both tasks, Task 1 and Task 2, have the same priority, the system will perform the task which, in terms of absolute time, must be completed first. Therefore since time $t_o+20$ is earlier than time $t_1+20$, Task 1 will be executed first.

The situation presented by Task 3 and Task 4 further illustrates task prioritization. Note, however, that both Task 1 and Task 2 will be completed before execution of Task 3 and/or Task 4 begins because Task 1 and Task 2 have the highest priority. Task 3 has a priority of "2" and a duration of 5. Task 3 was posted at time $t_0$. The time deadline for Task 3 is five (5) time units subsequent to time $t_0$, i.e. $t_0+5$.

Task 4 also has a priority of "2" and a duration of 1. Task 4 was posted at time $t_1$. The time deadline for Task 4 is one (1) time unit subsequent to time $t_1$, i.e. $t_1+1$. The situation with regard to Task 3 and Task 4 is illustrated below in the following time line:

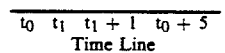

Time Line

Since the priority for Task 3 and Task 4 is the same, the system will perform the task which, in terms of absolute time, must be completed first. Therefore, since the deadline $(t_1+1)$ for Task 4 is earlier than the deadline $(t_0+5)$ for Task 3, Task 4 will be completed first.

The actual fields in the agenda register are the contents, priority, time-required, requestor, certainty, type, time-in and identification fields. The content field indicates the contents of the tasks which will be evaluated when the task is to be executed. The priority field is an integer representing the requestor's priority for the task. This field is optional and defaults to zero. The time-required field indicates the time at which the results of the tasks are needed, or the time at which the tasks will be considered expired, i.e. the time deadline. Again this field is optional and defaults to an unlimited amount of time. The requestor field is a user defined field identifying the requestor of the task. This field is optional and defaults to zero. The certainty field represents the lower bound of certainty required for the results of the task. This field is optional and defaults to the greatest certainty possible. The type field is a user defined field representing the type of task. This field is optional and defaults to zero. The time-in field indicates the time at which the task was accepted by the system and the identification field is a unique identifier for a given the task which serves as a tag for the requestor to identify.

In addition to the features previously described herein, the inference layer further includes a backward chaining operation which utilizes the directed acyclic graph to provide a conclusion. Briefly, when a system user queries the system for the value of a particular conclusion, all the rules and rule predicates contributing to the conclusion are evaluated. These rules are then fired thus causing the rule predicates to be evaluated, but only if their support has changed since the last evaluation. In order to compute only the minimally necessary nodes, the background chaining operation makes use of a scheme called "lazy evaluation". This scheme has two parts: (1) only those rules which provide the contributing values are fired; and (2) if a recomputed rule predicate provides support for a second rule other than the original rule conclusion which was backward chained from, the second rule is not re-evaluated although its status flag could change.

The inference portion also includes a forward chaining mechanism. Forward chaining means to begin operation from the variable input and then obtaining a conclusion. In order to forward chain, an evaluation of all the nodes in the directed acyclic graph is generally attempted.

In addition to performing calculus selection as described above, the control layer performs additional functions. One of these additional functions, indicated in FIG. 1, is designated "ignorance resolution". Given the computed ignorance measure described above, the user may deem it undesirable to perform a computation with one or more values the ignorance measure of which exceeds some arbitrary predetermined amount. Therefore, the control layer may be programmed to exclude from a computation a value the ignorance of which exceeds the predetermined amount, e.g. exclude a conclusion from a conclusion aggregation or source consensus operation, or not perform a computation at all where the value having excessive ignorance is essential to the computation performance. An example of the latter case is premise evaluation where one variable value having excessive ignorance would prevent evaluation of a clause of a rule premise. In such cases where performance of the computation is otherwise prevented, it may nevertheless be desirable to proceed in spite of the ignorance. To resolve such ignorance related problems, the control layer may be programmed to prompt the user for a decision on such matters. The user may be thereby afforded the opportunity to substitute a default value, presumably having an acceptable ignorance associated therewith, for the excessively ignorant value.

The control layer also performs a function designated "conflict resolution" (FIG. 1). As described above, the term "conflict" is used herein to described the situation in which there is an absence of consistency between conclusions. Given such conflict, the control layer can be programmed to follow strategies to eliminate, and thereby resolve, the conflict. For example, given N conclusions respectively having N certainty intervals which are in conflict, each subset of N−1 intervals may be subjected to the source consensus operation and the smallest certainty interval from amongst those operations adopted as the result. Further, where consideration of the N−1 interval subsets fail to resolve the conflict, subsets of N−2, N−3, etc. intervals may be considered in turn until resolution is achieved. As a further example, other strategies may be programmed for conflict resolution based on a prioritization of the sources from which the conflicting conclusions derive. Additionally, the control layer may simply be programmed to apprise the user of the conflict, so that the user may take appropriate action to resolve the conflict.

In performing the belief revision function, the control layer computes flag values for each existing certainty interval and the computed flag appears with its associated certainty interval in the representation layer. The flag values are computed by the control layer to reflect the status of a value assigned to a variable or conclusion. The appearance of the flags in the representation layer is non-numerical meta-information designated "logical support". Flags having values "good", "bad-level i", "inconsistent", "not applicable" and "ignorant" can be computed as part of the control layer belief revision function. The "good" flag indicates the validity of the certainty interval of an individual rule conclusion (conclusion detachment interval), a conclusion derived from a conclusion aggregation operation (conclusion aggregation interval) or a conclusion derived from a source consensus operation (source consensus interval). Each such certainty interval is assessed to be valid so long as no change occurs in the certainty intervals and/or variable values used in its computation.

The "bad-level i" flag is attached to a certainty interval determined to no longer be "good". The "bad-level i" flag is, therefore, a validity assessment that may be applied to any of the certainty intervals described above with respect to the "good" flag as well as to the certainty interval for each variable at the system boundary. The level "i" in the deduction process at which the certainty interval deemed "bad" resides, and which should therefore be recomputed, is appended to the "bad" flag. Belief revision is described in more detail in U.S. patent application Ser. No. 103,465.

As previously noted, the values of variables may be used as inputs to rules to determine whether an appropriate context exists for firing a rule. As an example of context limitation, consider a rule used by a surface-ship for identifying submarines. The rule is based on the characteristics of a surface-radar sensor and the earth's curvature. The surface-radar's horizon is limited by the earth's curvature to a range of approximately 20 nautical miles. Therefore, any surface-ship detected by the surface-radar would first be reported at a range of approximately 20 miles, as the detected surface-ship appears on the horizon. The only way in which a first report could occur at a closer range is if the detected object were to emerge from the surface at a closer distance, i.e. what is referred to as a "close-distance radar pop-up". Aside from abnormal weather conditions, sensor malfunctions, etc., the rule is plausible since it provides the correct conclusion most of the time. The plain English version of the rule would state: "Assuming that a surface-radar was used to generate a sensor report, if the first time that the object was detected the object was located at a distance of less than 20 miles from our radar, then it is most likely that it is a submarine. Otherwise, there is a small change that it is not a submarine." This rule would be subject to a context limitation such that it would only be fired if the source of the initially observed object distance is the surface-radar. Such a context limitation can be modeled as a variable designated "sensor source of initially observed object distance", that would be associated with the rule.

The value assigned to that variable would then have to be evaluated in order to determine whether or not to fire the rule. Context limitation is described in further detail in U.S. patent application Ser. No. 103,465.

The control portion further includes a task control feature to manage and control the execution of multiple, simultaneous recurrent tasks. The basic mechanism for achieving task control is the agenda mechanism, previously described herein, which provides for the prioritization of tasks. Task prioritization involves assigning a priority to a task and executing the task with the highest priority first. Preemption, or interruption, occurs when a task enters system with a higher priority than the one being currently executed. The current task will be interrupted in order to let the more important, i.e. the highest priority, task execute first. The interrupted task will be put back on the agenda, and will resume execution when it has the highest priority.

When a task is interrupted, placed on the agenda, and then once again becomes the highest priority task, the entire task may not need to be re-executed in order to provide a conclusion. Specifically, during the initial, i.e. before interruption, execution of the task, some values for rule predicates and rules may have been determined. These values are stored in memory and a status flag indicates whether support for the value is changed or unchanged. If the task again becomes the highest priority task, i.e. after interruption, then the status flags are checked to determine whether the previously-determined values are good, i.e. whether support for the value has not changed, or bad, i.e. whether support for the value has changed. If the value is good, then that value is fetched and utilized. If the value is bad, then a new value must be determined. This process generally is referred to as "caching node states" and potentially may result in a saving of a great amount of time. Therefore, it should be understood that caching node states is a very valuable feature in a real-time reasoning system.

Priority is not computed every time a task is moved into the agenda queue. The control portion therefore changes prioritization dynamically, which means that at any point if the system decides that its priorities have changed in terms of which task to execute first, then the control portion of the system has control to change prioritization automatically and instantaneously.

The prioritization queue identifies a next task to be executed, i.e. the task with the highest priority. When identifying the next task to be executed, if the time limit for that task has expired, then the interface is notified that the task was not executed. After each task is completed, the task with the highest priority which does not have an expired time period becomes the next task executed. With two task having equal priority, however, the task with the earliest time deadline is executed first as previously explained.

The control portion further comprises a planner to facilitate completing a task within a certain amount of time. Briefly, to perform this function, the control portion determins all activities required by a task, all plans which would perform those activities, all plans which would satisfy all those needs, and the best plan is noted and executed. In the present reasoning system, and for efficiency reasons, planning is only done just before a task executes. At this time, the planner takes a look at all the details of the task to be done. In this way, there is no dead ending, i.e. no finding out that a particular task should not be pursued any further.

The present system will only plan the execution of a task if it involves backward chaining. Neither data storage nor forward chaining involve planning because they are either too fast or lack a goal to focus the planner. Planning on backward chaining is done automatically if the execution of a task requested could take longer than the time budget allows. This prediction is based on the amount of time required to fire all the rule predicates, rules and variables which need to be re-evaluated.

The planner develops a plan by scanning the acyclic graph of predicates and rules. All predicates comprising a rule must be evaluated for the rule to be valid. The plans also generate different minimal sets of predicates and rules which must be evaluated in order to realistically provide the desired conclusion with a satisfactory certainty. These plans are evaluated in real-time but are generated off-line after compilation.

Once the alternative plans are generated, the next step is to evaluate the generated plans. In order to evaluate each plan, several features must be taken into consideration. For example, each plan takes time, but obviously the plan which fires the most rules will provide the most certain result. The user must provide the function to choose between a set of plans given their expected timings and results. If none of the plans is acceptable in terms of the certainty of the timing, the default value will be used.

Figure 6:
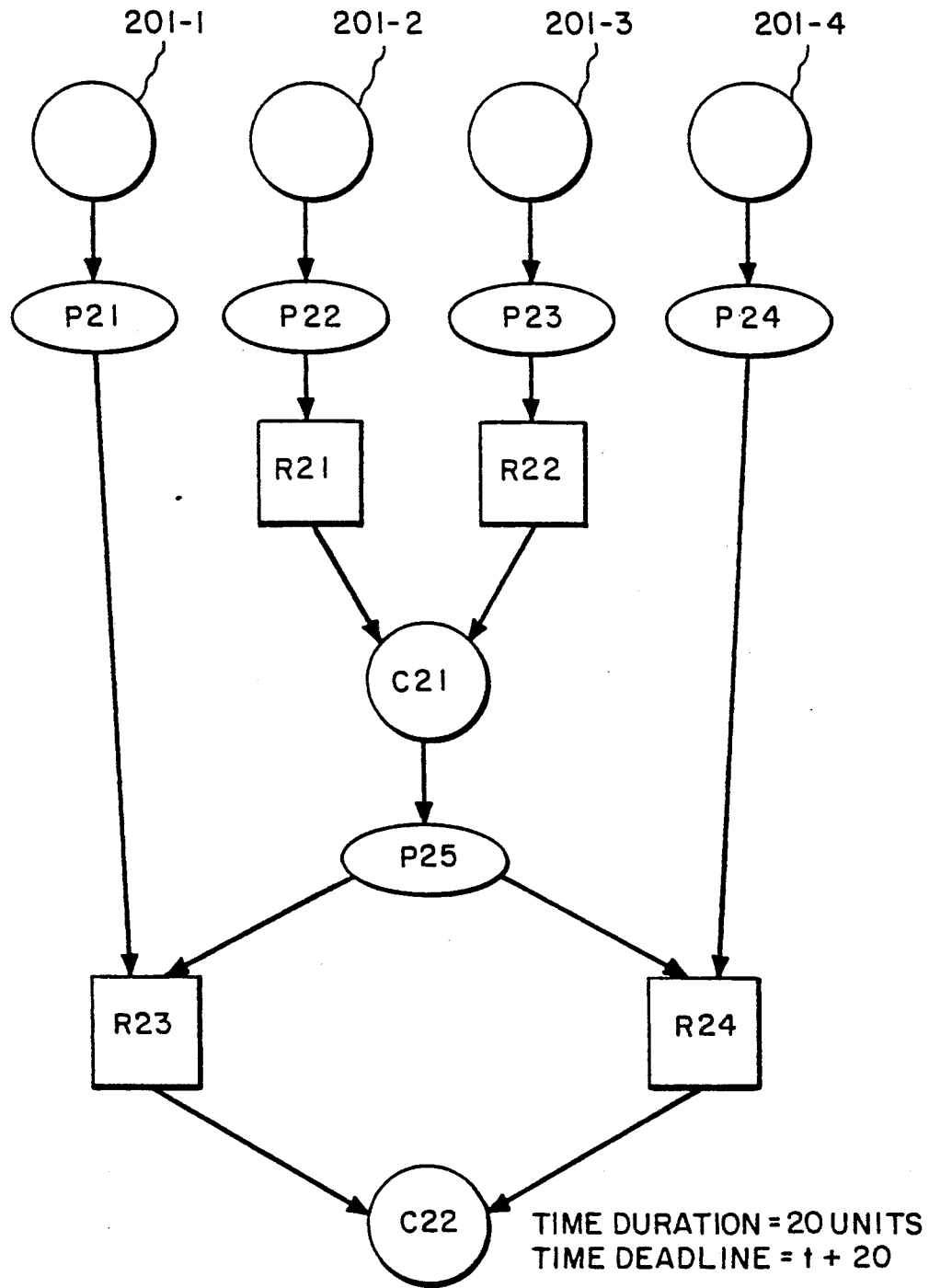
FIG. 6 illustrates another knowledge base in directed acyclic graph form in accordance with the present invention.

To facilitate an understanding of the planning mechanism, an example is shown and explained herein in FIGS. 6–7. FIG. 6 is a simple knowledge base 200 wherein each variable 201-1 through 201-4 is represented as a node. Also each predicate P21–P25, each rule R21–R25 and each conclusion C21–C22 is represented as a node. Assume, for illustrative purposes, that the system user wants to know conclusion C22 within twenty time units from current time t, i.e., deadline=t+20.

As shown in FIGS. 7A–7D, four alternative plans are determined by the planner. Any one of these plans can be used to obtain a value for conclusion C22. If no time constraints are imposed, then all four plans are executed and the resulting conclusion value is the most accurate value the system can provide. Since in this example, there exists a maximum time duration of twenty time units, then the planner must determine the paths which provide the best value within the required time.

As previously mentioned, the dedicated table shown in FIG. 3 has time values associated with each predicate, and the system user inputs the time units required for the sensors to provide values for each variable. The time for a sensor to provide a variable value may require a long time period, such as twenty five units of time, as shown with variable 201-1. Variables 201-2 and 201-4, however, require a nominal amount of time for input and do not have units associated therewith. These variables, for example, may be user input variables such as the formation of aircraft. Other variables, such as variable 201-3, may require an intermediate time period shown as three time units. Each rule R21–R25 also requires an amount of time to provide a rule conclusion. These time periods may be stored in a dedicated table and are indicated next to each node in FIG. 7.

Also, and importantly, by utilizing the backward chaining operation, it is possible to determine which nodes need to be re-evaluated and which nodes are unchanged since the last evaluation. The nodes which have an unchanged value since the last evaluation do not require re-evaluation, and therefore, the previous value stored in the node is utilized. This process, previously described herein as caching, requires a nominal amount of time and is assigned zero time units. Also as previously explained, the determination of nodes which need re-evaluation is determined by reviewing the status flags of each node.

The required time for execution of each plan then is determined by adding the time units required to re-evaluate each node which requires evaluation. The time required for executing each plan is indicated in FIGS. 7A-D. Since the plans shown in FIGS. 7A-B require greater than twenty time units, these plans will not provide information within the necessary time period. The plans shown in FIGS. 7C-D, however, can be executed within twenty time units. The system therefore will immediately execute the plans shown in FIGS. 7C-D. Also, note that execution of the plan in FIG. 7D will result in re-evaluation of each node required to be re-executed by the plan in FIG. 7C. Specifically, the plans in FIGS. 7C-D have common nodes, namely, conclusion C21, predicate P25, and rule R24. Therefore, although the absolute time required for execution of the plans in FIGS. 7C-D is twenty-one (21) time units, i.e., 7(FIG. 7C)+14(FIG. 7D)=21, the actual execution time is much less, specifically, fourteen (14) time units, i.e. the time required to execute each node of both plans once. Thus, once conclusion C21, predicate P25, and rule R24 are fired in accordance with the plan in FIG. 7C, the values for these nodes are utilized in execution of the plan in FIG. 7D and these nodes are not re-fired.

Figure 7A:
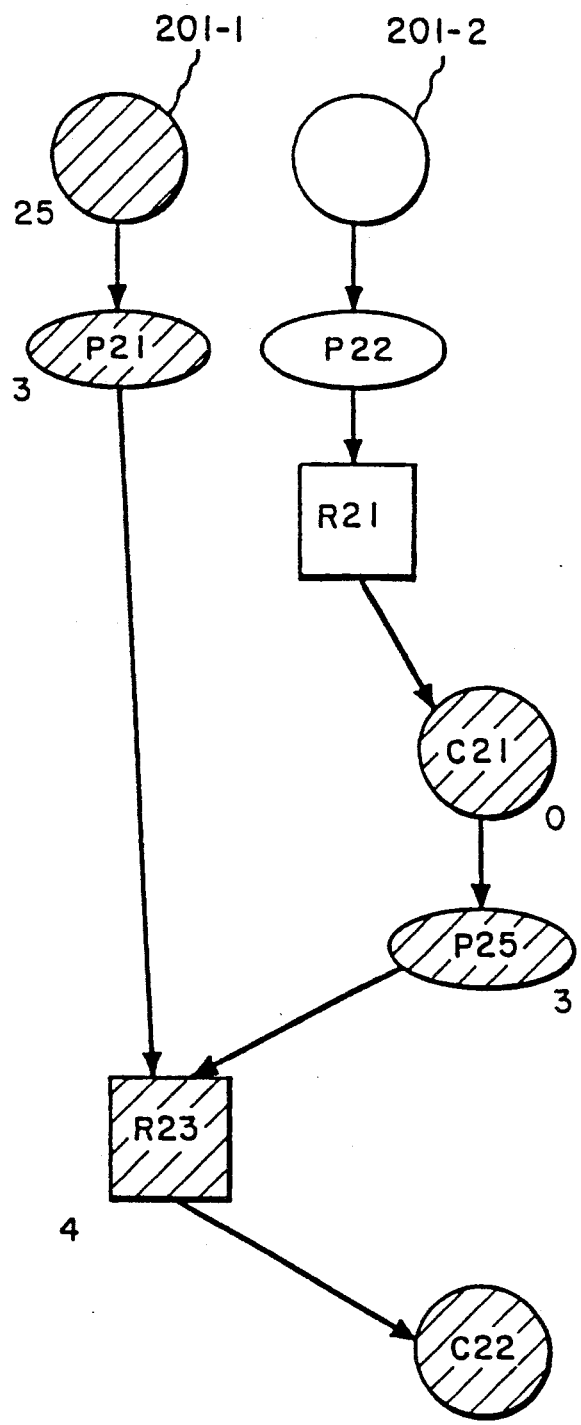
FIGS. 7a, 7b, 7c and 7d illustrate the planning operation utilized to execute the knowledge base shown in FIG. 6 within a time limit.
Figure 7B:
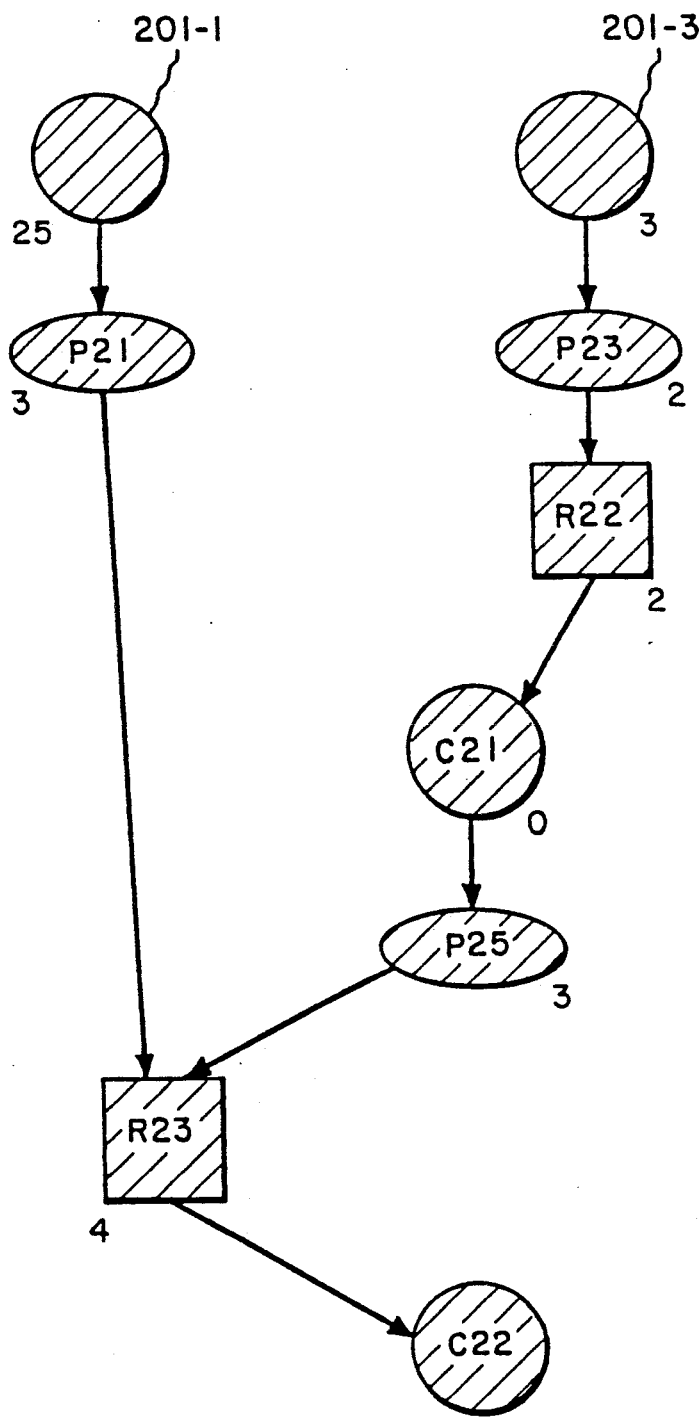
Figure 7C:
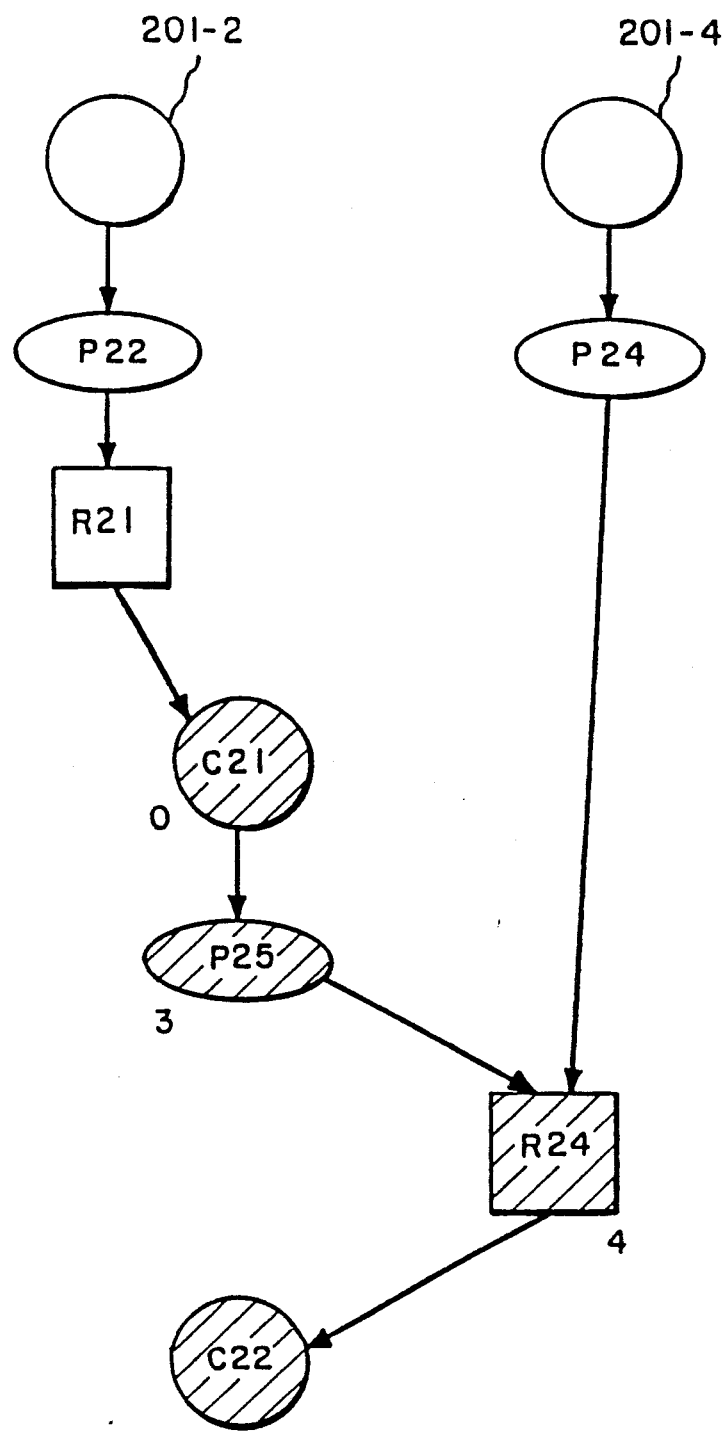
Figure 7D:
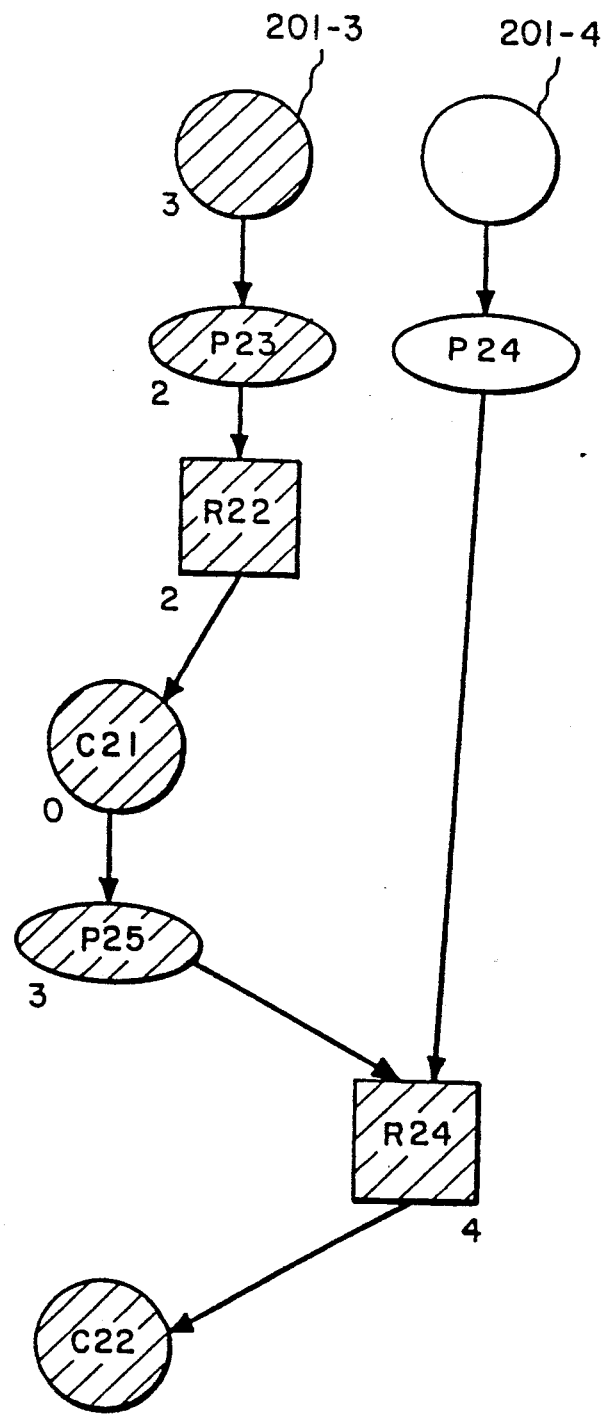

Also, after execution of the plans in FIGS. 7C-D, the system will attempt to execute the plans shown in FIGS. 7A-B in the hope that the actual execution time might be smaller than the planned limit based on the estimated execution time, and in this manner, a most precise value will eventually be provided to the system user.

Alternative planning operations also are contemplated. Importantly, although other planning is contemplated, for each of these alternate plans, the system will first obtain a value according to the plan which will obtain a conclusion most quickly. This plan is identified off-line, after compilation, under a worse case assumption that each link in the graph's path, representing the plan, requires re-evaluation. Therefore, the system is assured at least one conclusion. If the time deadline is shorter than the time duration for even the most quickly executed plan, however, then default values will be utilized. Therefore, before any alternative planning is selected, the system first determines a conclusion by executing the plan which requires the least amount of time for execution, or if not enough time exists to execute this plan, then default values are utilized.

One alternative planning operation is referred to as time-ordering. Specifically, the time required for executing each plan is determined, and the plan which requires the least amount of time to execute is given the highest priority. The second highest priority is assigned to the plan having the second shortest execution time. In this manner, each plan is assigned a priority so that the plan requiring the most execution time is assigned the lowest priority.

Another alternative planning operation is referred to as information-ordering. Specifically, the plan which provides the most certain result is assigned the highest priority. The plan which provides the second most certain result is assigned the second highest priority. In this manner, each plan is assigned a priority so that the plan having the least certain result is assigned the lowest priority. Certainty in the information-ordering planning operation is determined off-line, after compilation, by analyzing the sufficiency factor of each node of each plan. The lowest sufficiency factor present at any node of each plan is the sufficiency factor assigned to the plan. Then the plans are assigned priority according to the plan which has the highest sufficiency factor assigned thereto. For example, if Plan I comprises two nodes, one having a sufficiency factor five (5) and the other having a sufficiency factor three (3), then Plan I is assigned a sufficiency factor three (3). If Plan II comprises three nodes, one node having sufficiency factor seven (7), the second node having a sufficiency factor nine (9), and the third node assigned a sufficiency factor six (6), then Plan II will be assigned a sufficiency factor six (6). In accordance with information-ordering planning, Plan II will be assigned a higher priority than Plan I.

This planning operation is referred to as information-ordering planning because the plan which provides the most certain conclusion is assigned a higher priority for execution than plans which provide less certain conclusions. Put another way, the lowest sufficiency factor of each plan represents the most certain conclusion that the plan can provide. The most certain conclusion that a plan can provide is represented by the node of the plan which provides the least certain result.

Another alternative planning operation is referred to herein as user-determined planning. Specifically, the system user can assign priorities to plans in accordance with the plans desired to be executed first. Therefore, the user can eliminate execution of plans by assigning the plans very low priorities to ensure that they will not be executed within a time deadline.

Another alternative planning operation is referred to herein as user-defined cost ordering. Specifically, the system user can assign priorities to plans in accordance with the user's assessment of each plan's intrinsic execution costs. Each plan requires the execution of a sequence of tests, i.e. rule predicates. The plan's execution cost is the sum of the costs to execute each associated rule predicate. These costs vary, and may, for example, range from the need of specialized equipment to perform a test, to the destructive evaluation required by a different test, to user discomfort induced by another test. All these different costs are represented by proportional values on a same cost scale. Each plan then is assigned priority according to its cost. For example, a lower expense path will have a higher priority than a higher expense path.

Another alternative planning operation is referred to herein as profitability ordering. Specifically, after the system has determined the information ordering, and the user has determined the cost ordering, a ratio of certainty over cost is obtained. This value represents the profitability of the plan, i.e. the maximal amount of certainty available per unit of cost. The plans are then assigned priority in accordance with profitability. A more profitable plan will have a higher priority than a lower profitable plan.

Another alternative planning operation is referred to as structure-sharing. Specifically, the system identifies the sharing of common nodes between all the plans, and the plan with the highest number of nodes common to other plans is assigned the highest priority. The plan with the second highest number of common nodes is assigned the second highest priority. Therefore, it should be understood that each plan is assigned priority according to the number of common nodes it contains.

In another alternative planning operation, applicable to all alternative planning operations, if any ordering other than time-ordering is used, the planner will first select the highest priority plan from the selected ordering. The planner verifies the execution time of the highest priority plan to determine whether this plan can be executed within the time available. If this constraint is satisfied, the plan is executed. If this constraint is not satisfied, the next highest priority plan is selected and its execution time is analyzed. This process is repeated until the deadline occurs.

Again, it should be emphasized that the above-described alternative planning operations, i.e. time-ordering, information-content, user-determined, cost, profitability and structure-sharing, are not executed until the system has obtained at least one conclusion in accordance with the fastest executable plan, if time permits, or in accordance with default values.

The present real-time reasoning system also includes an interface, i.e. an input/output mechanism, to interact with the system user. Inputs and outputs are coordinated through task identification symbols. When a calling process inputs a task on the agenda, then a task ID is returned to the interface. That task ID can then be used to identify the results of the task. In this way, the calling process continues without waiting for the system to finish processing the task. This feature also allows for very fast input of data rates, although the input will not actually be recognized until its priority allows it to migrate to the top of the agenda queue. Input consists of expressions to be evaluated and some optional parameter. Output consists of a list of elements, specifically, the task ID, the task flag denoting the status of the task (expired, completed, interrupted) and the results of the task (either 1, 2, or 3 values). If a stream output is to be used, then when the task finishes executing, a list of the results are put on the stream. The calling process can pick the results off the stream as needed. If buffer results are desired, then the calling process simply asks the application for the results of the particular task and the results are returned if they are available.

Figure 8:
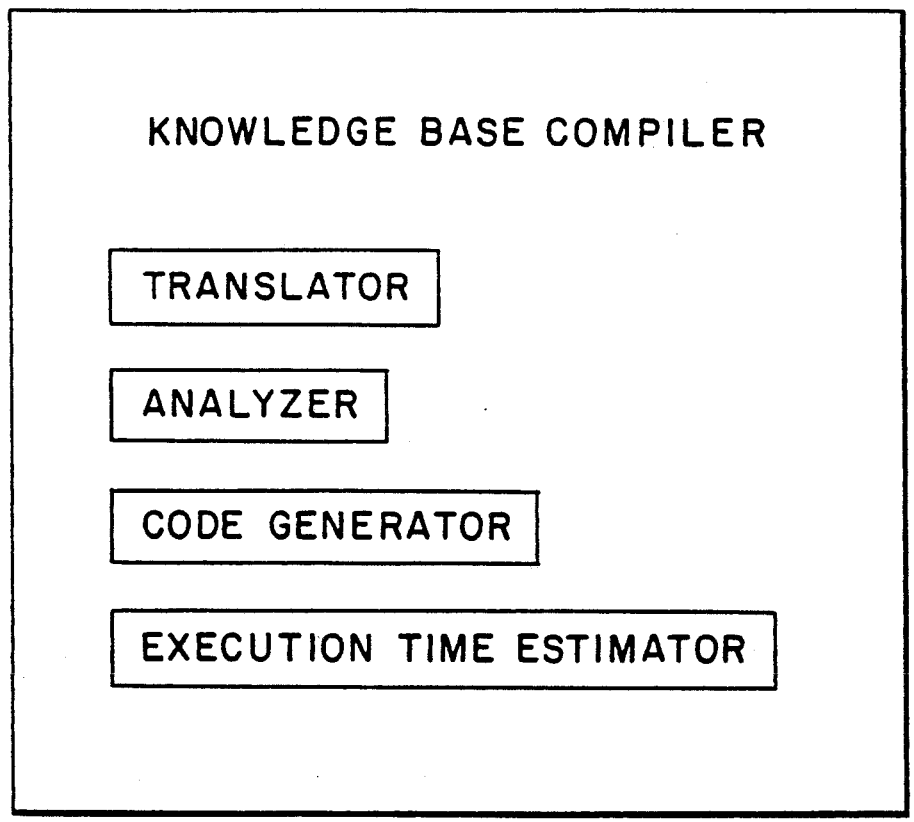
FIG. 8 illustrates a knowledge base compiler in accordance with the present invention.

To further facilitate practice of the present real-time reasoning system, a knowledge base compiler for compiling an "interpreted" knowledge base is described with reference to FIG. 8. The knowledge base compiler is an "off-line" unit in that the compiler does not operate during real-time operation of the present real-time reasoning system. The compiler is utilized to structure a previously developed "interpreted" knowledge base, such as the knowledge base developed by the system described in U.S. patent application Ser. No. 103,465, so that real-time operations are facilitated. As shown in FIG. 8, the knowledge base compiler comprises a translator, an analyzer, a code generator, and an execution time estimator. The translator reads and parses the previously developed "interpreted" knowledge base. Specifically, the translator separates the variables, rule predicates, rules and conclusions. Each rule, variable, rule predicate, and conclusion is represented as a node. Further, although the rule predicates are represented as nodes, the actual functions of the predicates are stored in a separate file as hereinbefore explained with respect to FIG. 3. The analyzer of the compiler derives and analyzes the rule topology from the translator, and the analyzer creates pointers between the nodes and dedicated files, such as the rule predicate file and the execution time file, to form a directed acyclic graph.

After the directed acyclic graph is generated by the translator and analyzer, the code generator of the compiler writes the directed acyclic graph into an output file in memory to be used by the execution unit of the system. The code generator writes the graph in a computer language such as LISP or C.

As previously explained, the compiler further includes an execution time estimator for estimating the execution time required for the firing of each node in the directed acyclic graph. Specifically, after the directed acyclic graph has been written to the output file, the execution time estimator sequentially fires, i.e. activates, each individual node. During this process, the execution time required for the operation associated with the node is measured, and each execution time is logged into the dedicated execution time file. This file, as hereinbefore described with reference to the planning operation of the control layer, is then used at run time to determine the costs, in terms of time, of using specific portions of the graph to obtain a conclusion.

The real-time reasoning with uncertainty system of the present invention is preferably implemented in software by the use of structured objects (or frame or unit) programming language. The inventive system may be practiced on a variety of computer types, such as Sun workstation as manufactured by Sun Microsystems, Inc. of Mountainview, California or Symbolics Lisp Machine as manufactured by Symbolics, Inc. of Concord, Md.

It is preferred herein to modularize the software implementation of the inventive real-time reasoning with uncertainty system in order to facilitate its preparation. Appendix I to the specification provides a list of software filed modules that comprise a preferred structure for an efficient software implementation of the present invention. The list in Appendix I is neither all-inclusive or limiting.

As indicated above, the real-time reasoning with uncertainty system of the present invention is intended for implementation in an automated real-time rule based reasoning system. As such, it is understood that the overall system would include all of the standard features of an automated rule base reasoning system, including both artificial and real-time reasoning features.

Although a particular set of t-norm and t-conorm functions derived from Schweizer et al. have been adapted for use in the embodiment of the present invention illustrated and described hereinabove, the invention is not so limited. Other families of t-norms and t-conorm functions are known in the art and can be adapted for utility and practice of the real-time reasoning with uncertainty system of the present invention.

Further, as previously mentioned, fuzzy number representations also can be utilized in the present invention. Such fuzzy number representations are identified in allowed U.S. patent application Ser. No. 103,465 which is incorporated herein in its entirety, by reference.

Also, parallel processing techniques can be utilized in the present invention, such as in the inference layer, to provide further improvements in real-time operation. For example, tasks such as premise evaluation, where multiple premises apply to a same rule, can be performed in parallel. Also, rule evaluation, reasoning path evaluation, and multiple task execution can also be performed in parallel. Generally, parallel processing is achieved by using a plurality of microprocessors to reduce the required time to perform tasks.

While a preferred embodiment has been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

APPENDIX I

| Module | Module Content |
| --- | --- |
| Predicates | A file containing all of the predicates required to define tests in the clauses of the rule premises |
| Data Structure | A file containing the most common data structures with their own internal accessing functions. For example, the recurrent data structure triple (value, lower-bound, upper-bound). |
| Rules Handling | A file containing the functions that evaluate the rule context, rule premise and rule conclusion. Such functions determine if the rule is applicable given the current context and compute the premise certainty and conclusion detachment intervals. |
| Formula Handling | A file containing functions that search for the rules relevant to a conclusion being determined, the functions for computing the conclusion aggregation and source consensus intervals and a function for selecting the best conclusion on the basis of its certainty interval. |
| Rule Chaining | A file containing the functions that initiate and control the forward and backward chaining process as well as the propagation of flags caused by changes in input data. |
| User Interface | A file containing the functions that allow the user to communicate with the reasoning system via menu and mouse interaction. |

What is claimed is:

1. A method, for practice on a computer, for time-constrained reasoning with uncertainty in a rule-based reasoning system comprising a directed acyclic graph stored in memory and comprising nodes representing a plurality of variable to which respective values can be assigned, a plurality of rule premises, a plurality of rules, and a plurality of conclusions, each of said rule premises comprising at least one clause including at least one of said variables to which respective values can be assigned, said method comprising the steps of:

selecting a node representing a conclusion to be determined;

determining alternative plans for executing said directed acyclic graph within a predetermined time deadline each alternative plan comprising a plurality of nodes forming a path through said directed acyclic graph, each path resulting in execution of said selected node;

executing said selected node by utilizing default values for each of said nodes if no alternative plan provides for execution of the selected node within the predetermined time deadline; and if an alternative plan provides for execution of the selected node within the predetermined time deadline, executing the selected node by first executing one alternative plan which provides for execution of the selected node within the predetermined time deadline and in the earliest absolute time, execution of each of said alternative plans comprising the steps of associating a value certainty interval with each value assigned to one of said variables of said one plan, said value certainty interval having a lower and an upper bound respectively representative of amounts of confirmation and failure of refutation of the assigned value, associating a sufficiency factor and a necessity factor with each rule node of said plan, said sufficiency factor representing a strength of belief that the rule is true given the rule premise is true, said necessity factor representing a strength of belief that the rule is false given the rule premise is false, computing a premise certainty interval from the value certainty intervals respectively associated with the values assigned to the premise variables, a lower bound of said premise certainty interval being a first predetermined function of the respective value certainty interval lower bounds, an upper bound of said premise certainty interval being said first function of the respective value certainty interval upper bounds, and executing one of said rules by computing a conclusion detachment certainty interval having a lower and an upper bound, said conclusion detachment interval lower bound being a second predetermined function of both said rule sufficiency factor and said premise certainty interval lower bound, the conclusion detachment upper bound being a third predetermined function of both said rule necessity factor and said premise certainty interval upper bound, said conclusion detachment interval lower and upper bounds respectively representing the amounts of confirmation and failure of refutation of the rule conclusion.

2. A time-constrained reasoning with uncertainty method in accordance with claim 1 further comprising the steps of:

assigning a priority to each alternative plan; and executing each of said alternative plans by sequentially executing the highest priority plan.

3. A time-constrained reasoning with uncertainty method in accordance with claim 2 wherein assigning a priority to each alternative plan comprises the steps of:

determining an execution time for each alternative plan;

assigning each plan priority according to said execution times, each plan having a shorter execution time being assigned a higher priority than each plan with a longer execution time.

4. A time-constrained reasoning with uncertainty method in accordance with claim 3 wherein determining an execution time for each alternative plan comprises the steps of:

executing each rule premise and each rule;

storing each respective time required to execute each respective rule premise and each respective rule; and summing the respective execution times for each rule premise and each rule in each respective alternative plan.

5. A time-constrained reasoning with uncertainty method in accordance with claim 2 wherein assigning a priority to each alternative plan comprises the steps of:

determining the lowest sufficiency factor of any node within each plan;

assigning each plan the determined lowest sufficiency factor thereof; and assigning each plan priority according to said sufficiency factors, each plan having a lower sufficiency factor being assigned a higher priority than each plan with a higher sufficiency factor.

6. A time-constrained reasoning with uncertainty method in accordance with claim 2 wherein assigning a priority to each alternative plan comprises the steps of:
determining a desired priority assignment from user-generated priorities; and
assigning each plan priority in accordance with said user-generated priorities.

7. A time-constrained reasoning with uncertainty method in accordance with claim 2 wherein assigning priority to each alternative plan comprises the steps of:
determining nodes common to other plans within each plan; and
assigning each plan priority according to the number of common nodes therein, each plan having a higher number of common nodes being assigned a higher priority than each plan with a lower number of common nodes.

8. A time-constrained reasoning with uncertainty method in accordance with claim 2 wherein assigning priority to each alternative plan comprises the steps of:
determining execution cost for each alternative plan; and
assigning each plan priority according to the execution cost thereof, each plan having a lower execution cost being assigned a higher priority than each plan with a higher execution cost.

9. A time-constrained reasoning with uncertainty method in accordance with claim 2 wherein assigning priority to each alternative plan comprises the steps of:
determining execution costs for each alternative plan;
determining the lowest sufficiency factor of any rule node within each plan;
assigning each plan the determined lowest sufficiency factor thereof;
generating a ratio of the lowest sufficiency factor and the execution cost of each plan; and
assigning each plan priority according to the ratio, each plan having a higher ratio having a higher priority than each plan with a lower ratio.

10. A time-constrained reasoning with uncertainty method in accordance with claim 2 wherein, subsequent to executing each of said plans and upon the same conclusion being provided by more than one plan, said method comprises the additional step of:
aggregating the same conclusions provided by different rules and having a same T-conorm disjunction operator by computing a conclusion aggregation certainty interval having a lower bound that is a fourth predetermined function of the conclusion detachment interval lower bounds respectively computed for the plans reaching the same conclusion, an upper bound of said conclusion aggregation interval being said fourth predetermined function of the conclusion detachment interval upper bounds respectively computed for the plans reaching the same conclusion, said conclusion aggregation interval lower and upper bounds respectively representing the amounts of confirmation and failure of refutation of the aggregated conclusion.

11. A reasoning with uncertainty method in accordance with claim 10 wherein upon computing a plurality of conclusion aggregation intervals for the same conclusion, each conclusion aggregation interval being associated with a respective T-conorm disjunction operator, said method comprises the additional step of:
computing a source consensus certainty interval by taking the intersection of said plurality of conclusion aggregation intervals.

12. A reasoning with uncertainty method in accordance with claim 10 wherein a selected conclusion is excluded from the computed conclusion aggregation certainty interval
even though said selected conclusion is the same as the conclusions to be aggregated, said selected conclusion having an associated conclusion detachment certainty interval, and subsequent to aggregating the same conclusion except the excluded selected conclusion, said method further comprising the step of:
computing a source consensus certainty interval by taking the intersection of the associated conclusion detachment certainty interval of said selected conclusion with each said conclusion aggregation certainty interval computed for the same conclusion as said selected conclusion, each conclusion aggregation certainty interval being associated with a respective T-conorm disjunction operator.

13. A reasoning with uncertainty method in accordance with claim 2 further comprising the step of:
storing the priority of each alternative plan on an agenda.

14. A reasoning with uncertainty method in accordance with claim 2 further comprising the steps of:
interrupting execution of a presently executing plan;
assigning a new priority to said interrupted plan; and
executing said interrupted plan when it becomes the highest priority plan.

15. A reasoning with uncertainty method in accordance with claim 14 wherein executing said interrupted plan when it becomes the highes priority plan comprises the steps of:
determining whether values of any nodes have changed; and
re-executing only those nodes whose values have changed.

16. A reasoning with uncertainty system in accordance with claim 15 wherein determining whether values of any nodes have changed comprises the steps of:
determining whether any nodes whose output values are input to said node have changed;
designating the value of said node valid if the output values of any nodes which are input to said node have not changed; and
designating the value of said node not valid if the output values of any nodes which are input to said node have changed.

17. A reasoning with uncertainty method in accordance with claim 1 further comprising the steps of:
assigning a priority to each alternative plan;
determining an execution time for each alternative plan;
executing each alternative plan by sequentially executing the highest priority plan having an execution time less than the predetermined time deadline.

18. A reasoning with uncertainty method in accordance with claim 1 wherein said value certainty, premise certainty and conclusion detachment intervals are defined on an interval $[0, 1.0]$;
said premise certainty interval being computed in accordance with the equation;

$$[b,B] = [T_i(a_1, a_2, \ldots a_m), T_i(A_1, A_2, \ldots, A_m)]$$

where:

[b,B] is said premise certainty interval;

$[a_1, A_1], [a_2, A_2], \ldots, [a_m, A_m]$ are m said value certainty intervals associated with the values assigned to the premise variables; and $T_i$ is a triangular norm (T-norm) function selected from a first function set comprising predetermined T-norm functions $T_1$, $T_2$ and $T_3$; and said conclusion detachment interval being computed in accordance with the equation:

$$[c,C] = [T_i(s,b), N(T_i(n, N(B)))]$$

where:

[c,C] is said conclusion detachment interval;

$T_i$ is the T-norm function selected from said first function set;

s is said rule necessity factor;

[b,B] is said premise certainty interval; and

N is a negation operator such that $N(a) = 1 - a$.

19. A reasoning with uncertainty method in accordance with claim 18 wherein each said T-norm function $T_i$ is selected from said first function set in accordance with an attitude toward uncertainty evaluation;

the T-norm function $T_1$ corresponding to a relatively conservative attitude toward uncertainty evaluation as compared to the T-norm functions $T_2$ and $T_3$;

the T-norm function $T_2$ corresponding to a relatively intermediate attitude toward uncertainty evaluation as compared to the T-norm functions for $T_1$ and $T_3$; and the T-norm function $T_3$ corresponding to a relatively nonconservative attitude toward uncertainty evaluation as compared to the T-norm functions $T_1$ and $T_2$.

20. A reasoning with uncertainty method in accordance with claim 10 wherein said value certainty, premise certainty, conclusion detachment and conclusion aggregation intervals are defined on an interval [0,1.0];

said premise certainty interval being computed in accordance with the equation:

$$[b,B] = [T_i(a_1, a_2, \ldots, a_m), T_i(A_1, A_2, \ldots, A_m)]$$

where:

[b,B] is said premise certainty interval;

$[a_1, A_1], [a_2, A_2], \ldots, [a_m, A_m]$ are m said value certainty intervals associated with the values assigned to the premise variables; and $T_i$ is a triangular norm (T-norm) function selected from a first function set comprising predetermed T-norm functions $T_1$, $T_2$ and $T_3$;

said conclusion detachment interval being computed in accordance with the equation;

$$[c,C] = T_i(s,b), N(T_i(n, N(B)))]$$

where:

[c,C] is said conclusion detachment interval;

$T_i$ is the T-norm function selected from said first function set;

s is said rule sufficiency factor n is said rule necessity factor;

[b,B] is said premise certainty interval; and

N is a negation operator such that $N(a) = 1 - a$;

said conclusion aggregation interval being computed in accordance with the equation:

$$[d,D] = [S_i(c_1, c_2, \ldots, c_m), S_i(C_1, C_2, \ldots, C_m)]$$

where:

[d,D] is said conclusion aggregation interval;

$[c_1, C_1], [c_2, C_2], \ldots, [c_m, C_m]$ are m said conclusion detachment intervals respectively associated with the same conclusion being aggregated; and $S_i$ is a triangular conorm (T-conorm) function selected from a second function set comprising predetermined T-conorm functions $S_2$, $S_{2.5}$ and $S_3$.

21. A reasoning with uncertainty method in accordance with claim 20 wherein each said T-norm function $T_1$ is selected from said first function set in accordance with an attitude toward uncertainty evaluation, such that:

the T-norm function $T_1$ corresponds to a relatively conservative attitude toward uncertainty evaluation as compared to the T-norm functions $T_2$ and $T_3$;

the T-norm function $T_2$ corresponds to a relatively intermediate attitude toward uncertainty evaluation as compared to the T-norm functions for $T_1$ and $T_3$; and the T-norm function $T_3$ corresponds to a relatively nonconservative attitude toward uncertainty evaluation as compared to the T-norm functions $T_1$ and $T_3$;

each said T-conorm function $S_i$ being selected in accordance with whether the rules providing the same conclusion being aggregated are characterized as being correlated, such that: said T-conorm function $S_2$ is selected for aggregating the same conclusions provided by uncorrelated rules, each uncorrelated rule providing a respective conclusion based on sources independent of sources for each other uncorrelated rule;

said T-conorm function $S_3$ is selected for aggregating the same conclusions provided by positively correlated rules, each positively correlated rule providing a respective conclusion based on sources related to sources of each other correlated rule; and said T-conorm function $S_{2.5}$ is selected for aggregating the same conclusion being provided by rules characterized as being of intermediate correlation between the correlated and uncorrelated rules.

22. A reasoning with uncertainty method in accordance with claim 1 wherein selected ones of said rules are each associated with a respective source of rule firing context information; and said method including the additional step of evaluating, prior to executing any of said selected rules, said context information to determined whether a context exists for executing the rule, and executing the rule only if the context exists.

23. A rule-based reasoning system for time-constrained reasoning with uncertainty for practice on a computer, comprising a memory including:

a knowledge base portion comprising a plurality of variables, rule premises, system rules, and conclusions being represented as nodes in a directed acyclic graph;

a representation portion for representing to a system user a value certainty interval associated with each value assigned to one of said variables, said value certainty interval having a lower and an upper bound respectively representative of amounts of confirmation and failure of refutation of the assigned value;

said representation portion additionally representing to the user a sufficiency factor and a necessity factor associated with each said rule, said sufficiency factor representing a strength of belief that said rule is true given said rule premise is true, said necessity factor representing a strength of belief that said rule is false given said rule premise is false;

an inference portion for computing a premise certainty interval from the value certainty intervals respectively associated with the values assigned to the variables, a lower bound of said premise certainty interval being a first computational function of the respective value certainty interval lower bounds, said first function being selected in said control portion, an upper bound of said premise certainty interval being said first function of the respective value certainty interval upper bounds;

said inference portion executing each rule by computing a conclusion detachment interval having a lower and an upper bound, the conclusion detachment interval lower bound being a second computational function of both said rule sufficiency factor and said premise certainty interval lower bound, the conclusion detachment interval upper bound being a third computational function of both said rule necessity factor and said premise certainty interval upper bound, said second and third functions being selected by said control portion, said conclusion detachment interval lower and upper bounds being respectively representative of the amounts of confirmation and failure of refutation of the conclusion; and a control portion for determining whether rules providing a same conclusion are correlated, and based upon the determination, said control portion selecting a T-conorm for use by said inference portion for performing a conclusion aggregation operation, said control portion further comprising a planning mechanism for determining alternative plans for reaching a selected conclusion and a task control mechanism for assigning a priority to each alternative plan, each alternative plan comprising a plurality of nodes forming a path through said directed acyclic graph, each path resulting in execution of said selected node.

24. A time-constrained reasoning with uncertainty system in accordance with claim 23 wherein said inference portion is adapted to compute a conclusion aggregation certainty interval for the same conclusion provided by more than one rule in a predetermined group of said rules, each of said rules in said predetermined group having a same T-conorm disjunction operator, a lower bound of said conclusion aggregation interval being a fourth computational function of the conclusion detachment interval lower bounds respectively computed for the rules providing the same conclusion, an upper bound of said conclusion aggregation interval being said fourth function of the conclusion detachment interval upper bounds respectively computed for the rules providing the same conclusion, said fourth function being selected by said control portion, said conclusion aggregation interval lower and upper bounds being respectively representative of the amount of confirmation and failure of refutation of the aggregated conclusion.

25. A time-constrained reasoning with uncertainty system in accordance with claim 24 wherein said inference portion is adapted to compute a source consensus certainty interval for a plurality of said conclusion aggregation intervals for the same conclusion having the same T-conorm disjunction operator, said source consensus interval being the intersection of said plurality of conclusion aggregation intervals.

26. A time-constrained reasoning with uncertainty system in accordance with claim 24 wherein
said inference portion is adapted to compute a source consensus certainty interval that is the intersection of an associated conclusion detachment certainty interval of a conclusion excluded from computation of said conclusion aggregation interval with each said conclusion aggregation certainty interval computed for the same conclusion as said selected conclusion.

27. A time-constrained reasoning with uncertainty system in accordance with claim 23 wherein said value certainty, premise certainty and conclusion detachment intervals are defined on an interval [0,1.0];
said inference portion computing said premise certainty interval in accordance with the equation:

$$[b,B] = [T_i(a_1,a_2,\ldots,a_m), T_i(A_1,A_2,\ldots,A_m)]$$

where:

[b,B] is said premise certainty interval;

$[a_1,A_1], [a_2,A_2], \ldots, [a_m,A_m]$ are m said value certainty intervals associated with the values assigned to the premise variables; and $T_i$ is a triangular norm (T-norm) function selected from a first function set comprising predetermined T-norm functions $T_1$, $T_2$ and $T_3$; and said. inference portion computing said conclusion detachment interval in accordance with the equation:

$$[c,C] = [T_i(s,b), N(T_i(n,N(B)))]$$

where:

[c,C] is said conclusion detachment interval;

$T_i$ is the T-norm function selected from said first function set;

s is said rule sufficiency factor;

n is said rule necessity factor;

[b,B] is said premise certainty interval; and

N is a negation operator such that $N(a) = 1-a$.

28. A time-constrained reasoning with uncertainty system in accordance with claim 27 wherein said control portion selects each said T-norm function $T_i$ for use by said inference portion in computing said premise certainty and conclusion detachment intervals;

each said T-norm function $T_i$ corresponding to a different attitude toward uncertainty evaluation such that:

the T-norm function $T_1$ corresponds to a relatively conservative attitude toward uncertainty evaluation as compared to the T-norm functions $T_2$ and $T_3$;

the T-norm function $T_2$ corresponds to a relatively intermediate attitude toward uncertainty evaluation as compared to the T-norm functions for $T_1$ and $T_3$; and the T-norm function $T_3$ corresponds to a relatively nonconservative attitude toward uncertainty evaluation as compared to the T-norm functions $T_1$ and $T_3$.

29. A time-constrained reasoning with uncertainty method in accordance with claim 24 wherein said value certainty, premise certainty, conclusion detachment and conclusion aggregation intervals are defined on an interval [0,1.0];

said inference portion computing said premise certainty interval in accordance with the equation:

$$[b,B] = [T_i(a_1, a_2, \ldots, a_m), T_i(A_1, A_2, \ldots, A_m)]$$

where:

[b,B] is said premise certainty interval;

$[a_1, A_1], [a_2, A_2], \ldots, [a_m, A_m]$ are m said value certainty intervals associated with the values assigned to the premise variables; and $T_i$ is a triangular norm (T-norm) function selected from a first function set comprising predetermined T-norm functions $T_1$, $T_2$ and $T_3$;

said inference portion computing said conclusion detachment interval in accordance with the equation:

$$[c,C] = [T_i(s,b), N(T_i(n,N(B)))]$$

where:

[c,C] is said conclusion detachment interval;

$T_i$ is a T-norm function selected from said first function set;

s is said rule sufficiency factor;

n is said rule necessity factor;

[b,B] is said premise certainty interval; and

N is a negation operator such that $N(a) = 1 - a$; and said inference portion computing said conclusion aggregation interval in accordance with the equation:

$$[d,D] = [S_i(c_1, c_2, \ldots, c_m), S_i(C_1, C_2, \ldots, C_m)]$$

where:

[d,D] is said conclusion aggregation interval;

$[c_1, C_1], [c_2, C_2], \ldots, [c_m, C_m]$ are m said conclusion detachment intervals respectively associated with the same conclusion being aggregated; and $S_i$ is a triangular conorm (T-conorm) function selected from a second function set comprising predetermined T-conorm functions $S_2$, $S_{2.5}$ and $S_3$.

30. A time-constrained reasoning with uncertainty system in accordance with claim 29 wherein said control portion selects each said T-norm function $T_i$ for use by said inference portion in computing said premise certainty and conclusion detachment intervals, each said T-norm function $T_i$ corresponding to a different attitude toward uncertainty evaluation such that:

the T-norm function $T_1$ corresponds to a relatively conservative attitude toward uncertainty evaluation as compared to the T-norm functions $T_2$ and $T_3$;

the T-norm function $T_2$ corresponds to a relatively intermediate attitude toward uncertainty evaluation as compared to the T-norm functions $T_1$ and $T_3$; and the T-norm function $T_3$ corresponds to a relatively nonconservative attitude toward uncertainty evaluation as compared to the T-norm functions $T_1$ and $T_3$, said control portion selecting each said T-conorm function $S_i$ for use by said inference portion in computing said conclusion aggregation interval, each said T-conorm function $S_i$ being selected in accordance with whether the rules providing the same conclusion being aggregated are characterized as being correlated, such that:

said T-conorm function $S_2$ is selected for aggregating the same conclusions provided by uncorrelated rules, each uncorrelated rule providing a respective conclusion based on sources independent of sources for each other uncorrelated rule;

said T-conorm function $S_3$ is selected for aggregating the same conclusions provided by positively correlated rules, each positively correlated rule providing a respective conclusion based on sources related to sources of each other correlated rule; and said T-conorm function $S_{2.5}$ is selected for aggregating the same conclusions being provided by rules characterized as being of intermediate correlation between the correlated and uncorrelated rules.

31. A time-constrained reasoning with uncertainty system in accordance with claim 23 wherein an ignorance measure is maintained in said representation portion and associated with each said value certainty, premise certainty and conclusion detachment interval, said ignorance measure being equal to the arithmetic difference between the upper and lower bound of the interval with which it is associated.

32. A time-constrained reasoning with uncertainty system in accordance with claim 23 wherein selected ones of said rules are each associated with a respective source of rule firing context information; and said control portion evaluating, prior to the firing of each said selected rule, said context information to determine whether an appropriate context exists for the rule firing.

33. A time constrained reasoning with uncertainty system in accordance with claim 23 wherein said representation portion further comprises an agenda mechanism, said agenda mechanism having tasks stored therein, each of said tasks being assigned a priority by the planning mechanism of said control portion.

34. A time-constrained reasoning with uncertainty system in accordance with claim 33 wherein said agenda mechanism includes a task interrupt mechanism.

35. A time-constrained reasoning with uncertainty system in accordance with claim 34 wherein said task interrupt operation provides that a first task being executed can be interrupted so that a second task having a higher priority than said first task can be executed, said first task being placed in said agenda mechanism in accordance with its priority.

36. A time-constrained reasoning with uncertainty system in accordance with claim 35 wherein said interrupted first task when it becomes the highest priority task is executed, each node which comprises said task is scanned to determine whether the value thereof has changed, if said value has not changed then using that value otherwise executing said node.

37. A time-constrained reasoning with uncertainty system in accordance with claim 36 wherein whether the value of said node is valid is indicated by a status flag, said status flag being controlled by whether the output values of any nodes which are input to said node have changed.

38. A time-constrained reasoning with uncertainty system in accordance with claim 23 wherein said task control mechanism is operable to assign a priority to each alternative plan in accordance with a total time required to execute each respective plan.

39. A time-constrained reasoning with uncertainty system in accordance with claim 23 wherein said task control mechanism is operable to assign priority to each alternative plan in accordance with a sufficiency factor indicating the certainty of the conclusion reached by each plan.

40. A time-constrained reasoning with uncertainty system in accordance with claim 23 wherein said task control mechanism is operable to assign priority to each alternative plan in accordance with user-generated priorities.

41. A time-constrained reasoning with uncertainty system in accordance with claim 23 wherein said task control mechanism is operable to assign priority to each alternative plan in accordance with execution costs of each plan.

42. A time-constrained reasoning with uncertainty system in accordance with claim 23 wherein said task control mechanism is operable to assign priority to each plan in accordance with a ratio of execution cost to a lowest sufficiency factor of each plan.

43. A time-constrained reasoning with uncertainty system in accordance with claim 23 wherein said task control is operable to assign priority to each alternative plan in accordance with the number of nodes in each plan which also are nodes of at least one other plan.

44. A time-constrained reasoning with uncertainty system in accordance with claim 23 further comprising an interface for communicating information from and to a system user.

45. A system, for practice on a computer, for time-constrained reasoning with uncertainty in a rule-based reasoning system comprising a plurality of rules, a plurality of rule premises and a plurality of conclusions, each of said premises comprising at least one clause including a variable to which a value can be assigned, said reasoning system comprising a memory including:
    means for associating a value certainty interval with each value assigned to one of said variables, said value certainty interval having a lower and an upper bound respectively representative of amounts of confirmation and failure of refutation of the assigned value;
    means for associating a sufficiency factor and a necessity factor with each said rule, said sufficiency factor representing a strength of belief that the rule conclusion is true given the rule premise is true, said necessity factor representing a strength of belief that the rule conclusion is false given the rule premise is false;
    means for computing a premise certainty interval from the value certainty intervals respectively associated with the values assigned to the premise variables, a lower bound of said premise certainty interval being a first predetermined function of the respective value certainty interval lower bounds, an upper bound of said premise certainty interval being said first function of the respective value certainty interval upper bounds;
    means for determining alternative plans for determining a conclusion, each alternative plan comprising a plurality of nodes forming a path through said directed acyclic graph;
    means for assigning a priority to each of said plans; and
    means for sequentially executing each plan according to its priority, said executing means comprising means for executing each of said rules by computing a conclusion detachment certainty interval having a lower and an upper bound, said conclusion detachment interval lower bound being a second predetermined function of both said rule sufficiency factor and said premise certainty interval lower bound, the conclusion detachment upper bound being a third predetermined function of both said rule necessity factor and said premise certainty interval upper bound, said conclusion detachment interval lower and upper bounds respectively representing the amounts of confirmation and failure of refutation of the conclusion.

46. A time-constrained reasoning with uncertainty system in accordance with claim 45 further comprising:
    means for aggregating the same conclusions provided by different rules and having a same T-norm disjunction operator by computing a conclusion aggregation certainty interval having a lower bound that is a fourth predetermined function of the conclusion detachment interval lower bounds respectively computed for the rules reaching the same conclusion, an upper bound of said conclusion aggregation interval being said fourth predetermined function of the conclusion detachment interval upper bounds respectively computed for the rules reaching the same conclusion, said conclusion aggregation interval lower and upper bounds being respectively representative of the amount of confirmation and failure of refutation of the aggregated conclusion.

47. A time-constrained reasoning with uncertainty system in accordance with claim 46 further comprising:
    means for computing a source consensus certainty interval by taking the intersection of a plurality of conclusion aggregation intervals.

48. A time-constrained reasoning with uncertainty system in accordance with claim 46 further comprising:
    means for excluding a selected conclusion from said aggregating step even though said selected conclusion is the same as the conclusions to be aggregated, said selected conclusion having an associated conclusion detachment certainty interval; and
    means for computing a source consensus certainty interval by taking the intersection of the associated conclusion detachment certainty interval of said selected conclusion with each said conclusion aggregation certainty interval computed for the same conclusion.

49. A time-constrained reasoning with uncertainty system in accordance with claim 45 wherein said value certainty, premise certainty and conclusion detachment intervals are defined on an interval [0,1.0];
    said premise certainty interval being computed in accordance with the equation:

$$[b,B] = [T_i(a_1, a_2, \ldots, a_m), T_i(A_1, A_2, \ldots, A_m)]$$

where:
[b,B] is said premise certainty interval;

$[a_1,A_1], [a_2,A_2], \ldots ,[a_m,A_m]$ are m said value certainty intervals associated with the values assigned to the premise variables; and $T_i$ is a triangular norm (T-norm) function selected from a first function set comprising the predetermined T-norm functions $T_1, T_2$ and $T_3$; and said conclusion detachment interval being computed in accordance with the equation:

$$[c,C]=[T_i(s,b),N(T_i(n,N(B)))]$$

where:

[c,C] is said conclusion detachment interval;

$T_i$ is the T-norm function selected from said first function set;

s is said rule sufficiency factor;

n is said rule necessity factor;

[b,B] is said premise certainty interval; and

N is a negation operator such that $N(a)=1-a$.

50. A time-constrained reasoning with uncertainty system in accordance with claim 49 wherein each said T-norm function $T_i$ is selected from said first function set in accordance with an attitude toward uncertainty evaluation;

the T-norm function $T_1$ corresponding to a relatively conservative attitude toward uncertainty evaluation as compared to the T-norm functions $T_2$ and $T_3$;

the T-norm function $T_2$ corresponding to a relatively intermediate attitude toward uncertainty evaluation as compared to the T-norm functions $T_1$ and $T_3$; and the T-norm function $T_3$ corresponding to a relatively nonconservative attitude toward uncertainty evaluation as compared to the T-norm functions $T_1$ and $T_2$.

51. A time-constrained reasoning with uncertainty system in accordance with claim 46 wherein said value certainty, premise certainty, conclusion detachment and conclusion aggregation intervals are defined on an interval [0,1.0];

said premise certainty interval being computed in accordance with the equation:

$$[b,B]=[T_i(a_1,a_2, \ldots ,a_m),T_i(A_1,A_2, \ldots ,A_m)]$$

where:

[b,B] is said premise certainty interval;

$[a_1,A_1], [a_2,A_2], \ldots ,[a_m,A_m]$ are m said value certainty intervals associated with the values assigned to the premise variables; and $T_i$ is a triangular norm (T-norm) function selected from a first function set comprising predetermined T-norm functions $T_1, T_2$ and $T_3$;

said conclusion detachment interval being computed in accordance with the equation:

$$[c,C]=[T_i(s,b),N(T_i(n,N(B)))]$$

where:

[c,C] is said conclusion detachment interval;

$T_i$ is the T-norm function selected from said first function set;

s is said rule sufficiency factor;

n is said rule necessity factor;

[b,B] is said premise certainty interval; and

N is a negation operator such that $N(a)=1-a$; and said conclusion aggregation interval being computed in accordance with the equation:

$$[d,D]=[S_i(c_1,c_2, \ldots ,c_m),S_i(C_1,C_2, \ldots ,C_m)]$$

where:

[d,D] is said conclusion aggregation interval;

$[c_1,C_1], [c_2,C_2], \ldots ,[c_m,C_m]$ are m said conclusion detachment intervals respectively associated with the same conclusion being aggregated; and $S_i$ is a triangular conorm (T-conorm) function selected from a second function set comprising predetermined T-conorm functions $S_2, S_{2.5}$ and $S_3$.

52. A time-constrained reasoning with uncertainty system in accordance with claim 51 wherein each said T-norm function $T_i$ is selected from said first function set in accordance with an attitude toward uncertainty evaluation, such that:

the T-norm function $T_1$ corresponds to a relatively conservative attitude toward uncertainty evaluation as compared to the T-norm functions $T_2$ and $T_3$;

the T-norm function $T_2$ corresponds to a relatively intermediate attitude toward uncertainty evaluation as compared to the T-norm functions $T_1$ and $T_3$; and the T-norm function $T_3$ corresponds to a relatively nonconservative attitude toward uncertainty evaluation as compared to the T-norm functions $T_1$ and $T_3$;

each said T-conorm function $S_i$ being selected in accordance with whether the rules providing the same conclusion being aggregated are characterized as being correlated, such that:

said T-conorm function $S_2$ is selected for aggregating the same conclusions provided by positively uncorrelated rules, each uncorrelated rule providing a respective conclusion based on sources independent of sources for each other uncorrelated rule;

said T-conorm function $S_3$ is selected for aggregating the same conclusions provided by correlated rules, each positively correlated rule providing a respective conclusion based on sources related to sources of each other correlated rule; and said T-conorm function $S_{2.5}$ is selected for aggregating the same conclusions being provided by rules characterized as being of intermediate correlation between the correlated and uncorrelated rules.

53. A time-constrained reasoning with uncertainty system in accordance with claim 45 wherein selected ones of said rules are each associated with a respected source of rule firing context information; and said system additionally including means for evaluating, prior to the firing of each said selected rule, said context information to determine whether a context exists for the rule execution.

54. A method, for practice on a computer, for time-constrained reasoning with uncertainty, said computer including an interpreted knowledge base including variables, rule predicates, rules and conclusions, said method comprising the steps of:

representing each variable, rule predicate, rule and conclusion as a node in a directed acyclic graph stored in a memory;

representing the connectivity of each variable, rule predicate, rule and conclusion from said interpreted knowledge base;

creating pointers between each variable, rule predicate, rule and conclusion in accordance with said interpreted knowledge base connectivity;

selecting a node representing a conclusion to be determined;

determining alternative plans for executing said directed acyclic graph within a predetermined time deadline, each alternative plan comprising a plurality of nodes forming a path through said directed acyclic graph, each path resulting in execution of said selected node;

executing said selected node by utilizing default values for each of said nodes if no alternative plan provides said conclusion within the predetermined time deadline;

executing the selected node by first executing one alternative plan which provides for execution of the selected within the predetermined time deadline and in the earliest absolute time, execution of each of said alternative plans comprising the steps of associating a value certainty interval with each value assigned to one of said variables of said one plan, said value certainty interval having a lower and an upper bound respectively representive of amounts of confirmation and failure of refutation of the assigned value, associating a sufficiency factor and a necessity factor with each rule node of said plan, said sufficiency factor representing a strength of belief that the rule is true given the rule premise is true, said necessity factor representing a strength of belief that the rule is false given the rule premise is false, computing a premise certainty interval from the value certainty intervals respectively associated with the values assigned to the premise variables, a lower bound of said premise certainty interval being a first predetermined function of the respective value certainty interval lower bounds, an upper bound of said premise certainty interval being said first function of the respective value certainty interval upper bounds, and executing one of said rules by computing a conclusion detachment certainty interval having a lower and an upper bound, said conclusion detachment interval lower bound being a second predetermined function of both said rule sufficiency factor and said premise certainty interval lower bound, the conclusion detachment upper bound being a third predetermined function of both said rule necessity factor and said premise certainty interval upper bound, said conclusion detachment interval lower and upper bounds respectively representing the amounts of confirmation and failure of refutation of the rule conclusion.

55. A time-constrained reasoning with uncertainty method in accordance with claim 54 further comprising the steps of:
determining an execution time required for firing each node before selecting a conclusion to be determined;
storing each said execution time in a dedicated file.

56. A time-constrained reasoning with uncertainty method in accordance with claim 55 further comprising the steps of:
assigning a priority to each alternative plan; and
executing each of said alternative plans sequentially by executing the highest priority plan first.

57. A time-constrained reasoning with uncertainty method in accordance with claim 56 wherein assigning a priority to each alternative plan comprises the steps of:
determining an execution time for each alternative plan;
assigning each plan priority according to said execution times, each plan having a shorter execution time being assigned a higher priority than each plan with a longer execution time.

58. A time-constrained reasoning with uncertainty method in accordance with claim 57 wherein determining an execution time for each alternative plan comprises the step of:
summing the respective execution times for each rule premise and each rule in each respective alternative plan.

59. A time-constrained reasoning with uncertainty method in accordance with claim 56 wherein assigning a priority to each alternative plan comprises the steps of:
determining the lowest sufficiency factor of any rule node within each plan;
assigning each plan the determined lowest sufficiency factor; and
assigning each plan priority according to said sufficiency factors, each plan having a lower sufficiency factor being assigned a higher priority than each plan with a higher sufficiency factor.

60. A time-constrained reasoning with uncertainty system in accordance with claim 56 wherein assigning a priority to each alternative plan comprises the steps of:
determining a desired priority assignment from user-generated priorities; and
assigning each plan priority in accordance with said user-generated priorities.

61. A time-constrained reasoning with uncertainty system in accordance with claim 56 wherein assigning priority to each alternative plan comprises the steps of:
determining nodes common to other plans within each plan; and
assigning each plan priority according to the number of common nodes therein, each plan having a higher number of common nodes being assigned a higher priority than each plan with a lower number of common nodes.

62. A time-constrained reasoning with uncertainty system in accordance with claim 56 wherein assigning priority to each alternative plan comprises the steps of:
determining execution costs for each alternative plan;
assigning each plan priority according to the execution cost thereof, each plan having a lower execution costs being assigned a higher priority than each plan with a higher execution cost.

63. A time-constrained reasoning with uncertainty system in accordance with claim 56 wherein assigning priority to each alternative plan comprises the steps of:
determining execution costs for each alternative plan;
determining the lowest sufficiency factor of any node within each plan;
assigning each plan the determined lowest sufficiency factor thereof;
generating a ratio of the lowest sufficiency factor to the execution cost of each plan; and
assigning each plan priority according to the ratio, each plan having a higher ratio having a higher priority than each plan with a lower ratio.

64. A time-constrained reasoning with uncertainty method in accordance with claim 56 wherein, subsequent to executing each of said plans and upon the same conclusion being provided by more than one plan, said method comprises the additional step of:

aggregating the same conclusions provided by different rules and having a same T-conorm disjunctive operator by computing a conclusion aggregation certainty interval having a lower bound that is a fourth predetermined function of the conclusion detachment interval lower bounds respectively computed for the plans reaching the same conclusion, an upper bound of said conclusion aggregation interval being said fourth predetermined function of the conclusion detachment interval upper bounds respectively computed for the plans reaching the same conclusion, said conclusion aggregation interval lower and upper bounds respectively representing the amounts of confirmation and failure of refutation of the aggregated conclusion.

65. A reasoning with uncertainty method in accordance with claim 64 wherein upon computing a plurality of conclusion aggregation intervals for the same conclusion, each conclusion aggregation interval being associated with a respective T-conorm disjunction operator, said method comprises the additional step of:

computing a source consensus certainty interval by taking the intersection of said plurality of conclusion aggregation intervals.

66. A reasoning with uncertainty method in accordance with claim 64 wherein a selected conclusion is excluded from the computed aggregation certainty interval even though said selected conclusion is the same as the conclusions to be aggregated, said selected conclusion having an associated conclusion detachment certainty interval, and subsequent to aggregating the same conclusion except the excluded selected conclusion, said method further comprising the step of:

computing a source consensus certainty interval by taking the intersection of the associated conclusion detachment certainty interval of said selected conclusion with each said conclusion aggregation certainty interval computed for the same conclusion as said selected conclusion, each conclusion aggregation certainty interval being associated with a respective T-conorm disjunction operator.

67. A reasoning with uncertainty method in accordance with claim 56 further comprising the step of:

storing the priority of each alternative plan on an agenda.

68. A reasoning with uncertainty method in accordance with claim 56 further comprising the steps of:

interrupting execution of a presently executing plan; assigning a new priority to said interrupted plan; and executing said interrupted plan when it becomes the highest priority plan.

69. A reasoning with uncertainty method in accordance with claim 68 wherein executing said interrupted plan when it becomes the highest priority plan comprises the steps of:

determining whether values of any nodes have changed; and re-executing only those nodes whose values have changed.

70. A reasoning with uncertainty system in accordance with claim 69 wherein determining whether values of any nodes have changed comprises the steps of:

determining whether any nodes whose output values are input to said node have changed;

designating the value of said node valid if the output values of any nodes which are input to said node have not changed; and designating the value of said node not valid if the output values of any nodes which are input to said node have changed.

71. A reasoning with uncertainty system in accordance with claim 54 further comprising the steps of:

assigning a priority to each alternative plan;

determining an execution time for each alternative plan;

executing each alternative plan by sequentially executing the highest priority plan having an execution time less than the predetermined time deadline.

72. A reasoning with uncertainty method in accordance with claim 54 wherein said value certainty, premise certainty and conclusion detachment intervals are defined on an interval [0,1.0];

said premise certainty interval being computed in accordance with the equation;

$$[b,B] = [T_i(a_1, a_2, \ldots, a_m), T_i(A_1, A_2, \ldots, A_m)]$$

where:

[b,B] is said premise certainty interval;

$[a_1, A_1], [a_2, A_2], \ldots, [a_m, A_m]$ are m said value certainty intervals associated with the values assigned to the premise variables; and $T_i$ is a triangular norm (T-norm) function selected from a first function set comprising predetermined T-norm functions $T_1$, $T_2$ and $T_3$; and said conclusion detachment interval being computed in accordance with the equation:

$$[c,C] = [T_i(s,b), N(T_i(n, N(B)))]$$

where:

[c,C] is said conclusion detachment interval;

$T_i$ is the T-norm function selected from said first function set;

s is said rule necessity factor;

[b,B] is said premise certainty interval; and

N is a negation operator such that $N(a) = 1 - a$.

73. A reasoning with uncertainty method in accordance with claim 72 wherein each said T-norm function $T_i$ is selected from said first function set in accordance with an attitude toward uncertainty evaluation;

the T-norm function $T_1$ corresponding to a relatively conservative attitude toward uncertainty evaluation as compared to the T-norm functions $T_2$ and $T_3$;

the T-norm function $T_2$ corresponding to a relatively intermediate attitude toward uncertainty evaluation as compared to the T-norm functions $T_1$ and $T_3$; and the T-norm function $T_3$ corresponding to a relatively nonconservative attitude toward uncertainty evaluation as compared to the T-norm functions $T_1$ and $T_2$.

74. A reasoning with uncertainty method in accordance with claim 64 wherein said value certainty, premise certainty, conclusion detachment and conclusion aggregation intervals are defined on an interval [0,1.0];

said premise certainty interval being computed in accordance with the equation:

$$[b,B] = [T_i(a_1, a_2, \ldots, a_m), T_i(A_1, A_2, \ldots, A_m)]$$

where:

[b,B] is said premise certainty interval;

$[a_1,A_1], [a_2,A_2], \ldots ,[a_m,A_m]$ are m said value certainty intervals associated with the values assigned to the premise variables; and $T_i$ is a triangular norm (T-norm) function selected from a first function set comprising predetermined T-norm functions $T_1$, $T_2$ and $T_3$;

said conclusion detachment interval being computed in accordance with the equation;

$$[c,C]=T_i(s,b),N(T_i(n,N(B)))]$$

where:

[c,C] is said conclusion detachment interval;

$T_i$ is the T-norm function selected from said first function set;

s is said rule sufficiency factor n is said rule necessity factor;

[b,B] is said premise certainty interval; and

N is a negation operator such that $N(a)=1-a$; and said conclusion aggregation interval being computed in accordance with the equation:

$$[d,D]=[S_i(c_1,c_2,\ldots,c_m),S_i(C_1,C_2,\ldots,C_m)]$$

where:

[d,D] is said conclusion aggregation interval;

$[c_1,C_1],[c_2,C_2], \ldots ,[c_m,C_m]$ are m said conclusion detachment intervals respectively associated with the same conclusion being aggregated; and $S_i$ is a triangular conorm (T-conorm) function selected from a second function set comprising predetermined T-conorm functions $S_2$, $S_{2.5}$ and $S_3$.

75. A reasoning with uncertainty method in accordance with claim 74 wherein each said T-norm function $T_i$ is selected from said first function set in accordance with an attitude toward uncertainty evaluation, such that:

the T-norm function $T_1$ corresponds to a relatively conservative attitude toward uncertainty evaluation as compared to the T-norm functions $T_2$ and $T_3$;

the T-norm function $T_2$ corresponds to a relatively intermediate attitude toward uncertainty evaluation as compared to the T-norm functions for $T_1$ and $T_3$; and the T-norm function $T_3$ corresponds to a relatively nonconservative attitude toward uncertainty evaluation as compared to the T-norm functions $T_1$ and $T_3$;

each said T-conorm function $S_i$ being selected in accordance with whether the rules providing the same conclusion being aggregated are characterized as being correlated, such that:

said T-conorm function $S_2$ is selected for aggregating the same conclusions provided by uncorrelated rules, each uncorrelated rule providing a respective conclusion based on sources independent of sources for each other uncorrelated rule;

said T-conorm function $S_3$ is selected for aggregating the same conclusions provided by correlated rules, each positively correlated rule providing a respective conclusion based on sources related to sources of each other correlated rule; and said T-conorm function $S_{2.5}$ is selected for aggregating the same conclusions being provided by rules characterized as being of intermediate correlation between the correlated and uncorrelated rules.

76. A reasoning with uncertainty method in accordance with claim 54 wherein selected ones of said rules are each associated with a respective source of rule firing context information; and said method including the additional step of evaluating, prior to executing any of said selected rules, said context information to determine whether a context exists for executing the rule, and executing the rule only if the context exists.

77. A rule-based reasoning system for time-constrained reasoning with uncertainty for practice on a computer, said system receiving as an input an interpreted knowledge base including variables, rule predicates, rules and conclusions, said system comprising:

means for representing each variable, rule predicate, rule and conclusion as a node in a directed acyclic graph stored in a memory;

means for representing the connectivity of each variable, rule predicate, rule and conclusion from said interpreted knowledge base;

means for creating pointers between each variable, rule predicate, rule and conclusion in accordance with said interpreted knowledge base connectivity; and means for selecting a node representing a conclusion to be determined.

78. A time-constrained reasoning with uncertainty system in accordance with claim 77 wherein said means for selecting comprises:

a knowledge base portion comprising a plurality of variables, rule premises, system rules, and conclusions being represented as nodes in a directed acyclic graph;

a representation portion for representing to a system user a value certainty interval associated with each value assigned to one of said variables, said value certainty interval having a lower and an upper bound respectively representative of amounts of confirmation and failure of refutation of the assigned value;

said representation portion additionally representing to the user a sufficiency factor and a necessity factor associated with each said rule, said sufficiency factor representing a strength of belief that said rule is true given said rule premise is true, said necessity factor representing a strength of belief that said rule is false given said rule premise is false;

an inference portion for computing a premise certainty interval from the value certainty intervals respectively associated with the values assigned to the variables, a lower bound of said premise certainty interval being a first computational function of the respective value certainty interval lower bounds, said first function being selected in said control portion, an upper bound of said premise certainty interval being said first function of the respective value certainty interval upper bounds; and said inference portion executing each rule by computing a conclusion detachment interval having a lower and an upper bound, the conclusion detachment interval lower bound being a second computational function of both said rule sufficiency factor and said premise certainty interval lower bound, the conclusion detachment interval upper bound being a third computational function of both said rule necessity factor and said premise certainty interval upper bound, said second and third functions being selected by said control portion, said conclusion detachment interval lower and upper bounds being respectively representative of the amounts of confirmation and failure of refutation of the conclusion; and a control portion for determining whether rules providing a same conclusion are correlated, and based upon the determination, said control portion selecting a T-conorm for use by said inference portion for performing a conclusion aggregation operation, said control portion further comprising a planning mechanism for determining alternative plans for reaching a selected conclusion and a task control mechanism for assigning a priority to each alternative plan, each alternative plan comprising a plurality of nodes forming a path through said directed acyclic graph, each path resulting in execution of said selected node.

79. A time-constrained reasoning with uncertainty system in accordance with claim 78 wherein said inference portion is adapted to compute a conclusion aggregation certainty interval for the same conclusion provided by more than one rule in a predetermined group of said rules, a lower bound of said conclusion aggregation interval being a fourth computational function of the conclusion detachment interval lower bounds respectively computed for the rules providing the same conclusion, an upper bound of said conclusion aggregation interval being said fourth function of the conclusion detachment interval upper bounds respectively computed for the rules providing the same conclusion, said fourth function being selected by said control portion, said conclusion aggregation interval lower and upper bounds being respectively representative of the amount of confirmation and failure of refutation of the aggregated conclusion.

80. A time-constrained reasoning with uncertainty system in accordance with claim 79 wherein said inference portion is adapted to compute a source consensus certainty interval for a plurality of said conclusion aggregation intervals for the same conclusion having the same T-conorm disjunction operator, said source consensus interval being the intersection of said plurality of conclusion aggregation intervals.

81. A time-constrained reasoning with uncertainty system in accordance with claim 80 wherein
said inference portion is adapted to compute a source consensus certainty interval that is the intersection of an associated certainty interval of a conclusion excluded from computation of said conclusion aggregation interval with each said conclusion aggregation interval computed for the same conclusion as said selected conclusion.

82. A time-constrained reasoning with uncertainty system in accordance with claim 78 wherein said value certainty, premise certainty and conclusion detachment intervals are defined on an interval [0,1.0];
said inference portion computing said premise certainty interval in accordance with the equation:

$$[b,B]=[T_i(a_1,a_2,\ldots,a_m),T_i(A_1,A_2,\ldots,A_m)]$$

where:

[b,B] is said premise certainty interval;

$[a_1,A_1], [a_2,A_2], \ldots, [a_m,A_m]$ are m said value certainty intervals associated with the values assigned to the premise variables; and $T_i$ is a triangular norm (T-norm) function selected from a first function set comprising predetermined T-norm functions $T_1$, $T_2$ and $T_3$; and said inference portion computing said conclusion detachment interval in accordance with the equation:

$$[c,C]=[T_i(s,b),N(T_i(n,N(B)))]$$

where:

[c,C] is said conclusion detachment interval;

$T_i$ is the T-norm function selected from said first function set;

s is said rule sufficiency factor;

n is said rule necessity factor;

[b,B] is said premise certainty interval; and

N is a negation operator such that $N(a)=1-a$.

83. A time-constrained reasoning with uncertainty system in accordance with claim 82 wherein said control portion selects each said T-norm function $T_i$ for use by said inference portion in computing said premise certainty and conclusion detachment intervals;

each said T-norm function $T_i$ corresponding to a different attitude toward uncertainty evaluation such that:

the T-norm function $T_1$ corresponds to a relatively conservative attitude toward uncertainty evaluation as compared to the T-norm functions $T_2$ and $T_3$;

the T-norm function $T_2$ corresponds to a relatively intermediate attitude toward uncertainty evaluation as compared to the T-norm functions $T_1$ and $T_3$; and the T-norm function $T_3$ corresponds to a relatively nonconservative attitude toward uncertainty evaluation as compared to the T-norm functions for $T_1$ and $T_2$.

84. A time-constrained reasoning with uncertainty method in accordance with claim 79 wherein said value certainty, premise certainty, conclusion detachment and conclusion aggregation intervals are defined on an interval [0,1.0];

said inference portion computing said premise certainty interval in accordance with the equation:

$$[b,B]=[T_i(a_1,a_2,\ldots,a_m),T_i(A_1,A_2,\ldots,A_m)]$$

where:

[b,B] is said premise certainty interval;

$[a_1,A_1], [a_2,A_2], \ldots, [a_m,A_m]$ are m said value certainty intervals associated with the values assigned to the premise variables; and $T_i$ is a triangular norm (T-norm) function selected from a first function set comprising predetermined T-norm functions $T_1$, $T_2$ and $T_3$;

said inference portion computing said conclusion detachment interval in accordance with the equation:

$$[c,C]=[T_i(s,b),N(T_i(n,N(B)))]$$

where:

[c,C] is said conclusion detachment interval;

$T_i$ is a T-norm function selected from said first function set;

s is said rule sufficiency factor;
n is said rule necessity factor;
[b,B] is said premise certainty interval; and
N is a negation operator such that $N(a) = 1-a$; and
said inference portion computing said conclusion aggregation interval in accordance with the equation:

$$[d,D] = [S_i(c_1, c_2, \ldots, c_m), S_i(C_1, C_2, \ldots, C_m)]$$

where:

[d,D] is said conclusion aggregation interval;

$[c_1, C_1], [c_2, C_2], \ldots, [c_m, C_m]$ are m said conclusion detachment intervals respectively associated with the same conclusion being aggregated; and $S_i$ is a triangular conorm (T-conorm) function selected from a second function set comprising predetermined T-conorm functions $S_2$, $S_{2.5}$ and $S_3$.

85. A time-constrained reasoning with uncertainty system in accordance with claim 84 wherein said control portion selects each said T-norm function $T_i$ for use by said inference portion in computing said premise certainty and conclusion detachment intervals, each said T-norm function $T_i$ corresponding to a different attitude toward uncertainty evaluation such that:

the T-norm function $T_1$ corresponds to a relatively conservative attitude toward uncertainty evaluation as compared to the T-norm functions $T_2$ and $T_3$;

the T-norm function $T_2$ corresponds to a relatively intermediate attitude toward uncertainty evaluation as compared to the T-norm functions $T_1$ and $T_3$; and the T-norm function $T_3$ corresponds to a relatively nonconservative attitude toward uncertainty evaluation as compared to the T-norm functions $T_1$ and $T_2$, said control portion selecting each said T-conorm function $S_i$ for use by said inference portion in computing said conclusion aggregation interval, each said T-conorm function $S_i$ being selected in accordance with whether the rules providing the same conclusion being aggregated are characterized as being correlated, such that:

said T-conorm function $S_2$ is selected for aggregating the same conclusions provided by uncorrelated rules, each uncorrelated rule providing a respective conclusion based on sources independent of sources for each other uncorrelated rule;

said T-conorm function $S_3$ is selected for aggregating the same conclusions provided by correlated rules, each positively correlated rule providing a respective conclusion based on sources related to sources of each other correlated rule; and said T-conorm function $S_{2.5}$ is selected for aggregating the same conclusions being provided by rules characterized as being of intermediate correlation between the correlated and uncorrelated rules.

86. A time-constrained reasoning with uncertainty system in accordance with claim 78 wherein an ignorance measure is maintained in said representation portion and associated with each said value certainty, premise certainty and conclusion detachment interval, said ignorance measure being equal to the arithmetic difference between the upper and lower bound of the interval with which it is associated.

87. A time-constrained reasoning with uncertainty system in accordance with claim 78 wherein selected ones of said rules are each associated with a respective source of rule firing context information; and said control portion evaluating, prior to executing any of said selected rules, said context information to determine whether a context exists for executing the rule, and executing the rule only if the context exists.

88. A time constrained reasoning with uncertainty system in accordance with claim 78 wherein said representation portion further comprises an agenda mechanism, said agenda mechanism having tasks stored therein, each of said tasks being assigned a priority by the planning mechanism of said control portion.

89. A time-constrained reasoning with uncertainty system in accordance with claim 88 wherein said agenda mechanism includes a task interrupt operation.

90. A time-constrained reasoning with uncertainty system in accordance with claim 89 wherein said task interrupt operation provides that a first task being executed can be interrupted so that a second task having a higher priority than said first task can be executed, said first task being placed in said agenda mechanism in accordance with its priority.

91. A time-constrained reasoning with uncertainty system in accordance with claim 90 wherein said interrupted first task when it becomes the highest priority task is executed, each node which comprises said task is scanned to determine whether the value thereof has changed, if said value has not changed then using that value otherwise executing said node.

92. A time-constrained reasoning with uncertainty system in accordance with claim 91 wherein whether the value of said node is valid is indicated by a status flag, said status flag being controlled by whether the output values of any nodes which are input to said node have changed.

93. A time-constrained reasoning with uncertainty system in accordance with claim 78 wherein said task control mechanism is operable to assign priority to each alternative plan in accordance with its execution time.

94. A time-constrained reasoning with uncertainty system in accordance with claim 78 wherein said task control mechanism is operable to assign priority to each alternative plan in accordance with a sufficiency factor indicating the certainty of the conclusion reached by each plan.

95. A time-constrained reasoning with uncertainty system in accordance with claim 78 wherein said task control mechanism is operable to assign priority to each alternative plan in accordance with user-generated priorities.

96. A time-constrained reasoning with uncertainty system in accordance with claim 78 wherein said task control is operable to assign priority to each alternative plan in accordance with the number of nodes in each plan which also are nodes of at least one other plan.

97. A time-constrained reasoning with uncertainty system in accordance with claim 78 wherein said task control mechanism is operable to assign priority to each alternative plan in accordance with execution costs of each plan.

98. A time-constrained reasoning with uncertainty system in accordance with claim 78 wherein said task control mechanism is operable to assign priority to each plan in accordance with a ratio of execution cost to a lowest sufficiency factor of each plan.

99. A time-constrained reasoning with uncertainty system in accordance with claim 78 further comprising an interface for communicating information from and to a system user.

* * * * *